(12) United States Patent
Tanaka et al.

(10) Patent No.: US 11,565,527 B2
(45) Date of Patent: Jan. 31, 2023

(54) PRINTING METHOD AND PRINTING APPARATUS

(71) Applicant: CANON KABUSHIKI KAISHA, Tokyo (JP)

(72) Inventors: Hirokazu Tanaka, Tokyo (JP); Tsukasa Doi, Tokyo (JP); Junichi Nakagawa, Tokyo (JP); Mayuko Yamagata, Tokyo (JP); Satoshi Seki, Kanagawa (JP)

(73) Assignee: CANON KABUSHIKI KAISHA, Tokyo (JP)

(\*) Notice: Subject to any disclaimer, the term of this patent is extended or adjusted under 35 U.S.C. 154(b) by 16 days.

(21) Appl. No.: 17/382,077

(22) Filed: Jul. 21, 2021

(65) Prior Publication Data

US 2022/0032646 A1 Feb. 3, 2022

(30) Foreign Application Priority Data

Jul. 29, 2020 (JP) .............................. JP2020-128323

(51) Int. Cl.
*B41J 2/15* (2006.01)
*G06K 15/10* (2006.01)
(Continued)

(52) U.S. Cl.
CPC .............. *B41J 2/15* (2013.01); *G06K 15/107* (2013.01); *H04N 1/40087* (2013.01); *B41J 19/142* (2013.01)

(58) Field of Classification Search
CPC .......... B41J 2/15; B41J 19/142; B41J 2/2132; G06K 15/107; H04N 1/40087
See application file for complete search history.

(56) References Cited

U.S. PATENT DOCUMENTS 8,098,406 B2  1/2012 Hirota et al.
9,064,202 B2  6/2015 Tanaka
(Continued)

FOREIGN PATENT DOCUMENTS

| CN | 106427211 A | * | 2/2017 | ............ B41J 19/145 |
| CN | 106427212 A | * | 2/2017 | ............ B41J 15/044 |
| JP | 2009-094786 A |  | 4/2009 |  |

OTHER PUBLICATIONS

U.S. Appl. No. 17/382,087, filed Jul. 21, 2021 by Junichi Nakagawa, et al.

(Continued)

*Primary Examiner* — Julian D Huffman
(74) *Attorney, Agent, or Firm* — Venable LLP

(57) ABSTRACT

In a printing apparatus configured to print an image by bidirectional multipass printing while using multiple print element rows that apply color material of the same color, a high-quality image suppressed in hue unevenness and density unevenness is printed. To this end, the printing apparatus forms first and second dot patterns on a print medium in an overlapping manner. In the first dot pattern, dot arrays in which first dot groups are arranged at an interval B1 are arranged in a nozzle arrangement direction while being shifted from each other by C1 in a scanning direction of a print head. In the second dot pattern, dot arrays in which the first dot groups are arranged at the interval B1 are arranged in a nozzle arrangement direction while being shifted from each other by C2 in the scanning direction of the print head. Here, values of C1 and C2 are different.

19 Claims, 27 Drawing Sheets

(51) Int. Cl.
*H04N 1/40* (2006.01)
*B41J 19/14* (2006.01)

(56) References Cited

U.S. PATENT DOCUMENTS

| | | |
|---|---|---|
| 9,087,291 B2 | 7/2015 | Hori |
| 9,092,720 B2 | 7/2015 | Nakagawa |
| 9,210,292 B2 | 12/2015 | Miyake |
| 9,888,149 B2 | 2/2018 | Suzuki |
| 10,033,906 B2 | 7/2018 | Nakagawa |
| 10,225,439 B2 | 3/2019 | Suzuki |
| 10,771,657 B2 | 9/2020 | Doi |
| 2017/0036465 A1* | 2/2017 | Suzuki .................. B41J 2/2132 |
| 2020/0042840 A1 | 2/2020 | Doi |
| 2021/0019582 A1 | 1/2021 | Nakagawa |

OTHER PUBLICATIONS

U.S. Appl. No. 17/382,117, filed Jul. 21, 2021, by Tsukasa Doi et al.

\* cited by examiner

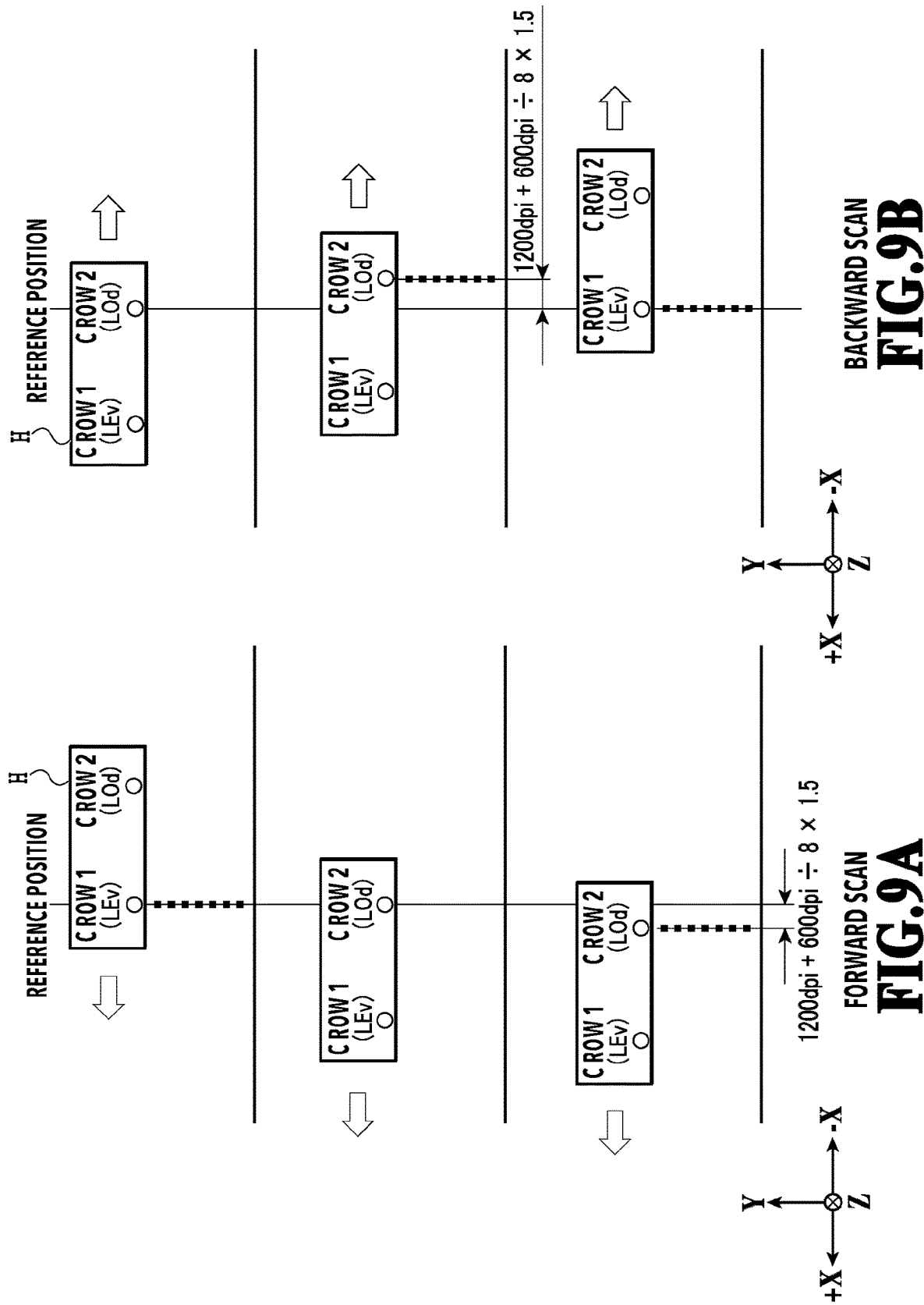

PRINTING METHOD AND PRINTING APPARATUS

BACKGROUND OF THE INVENTION

Field of the Invention

The present invention relates to a printing method and a printing apparatus.

Description of the Related Art

In a serial inkjet printing apparatus, the hue and density of an image sometimes change due to print misalignment of a print head relative to a print medium.

Japanese Patent Laid-Open No. 2009-94786 discloses a quantization method in which, in grayscale expression of at least two ink colors, area ratios of halftone dots of the respective colors in a dither matrix are maintained substantially the same irrespective of the positions of the halftone dots of the respective colors relative to each other. Employing such a quantization method can stabilize color development in the dither matrix and suppress color change even if print misalignment occurs between the ink colors.

However, in the case where print misalignment occurs between a forward scan and a backward scan in an inkjet printing apparatus configured to perform multipass printing in the forward and backward scans, the density of an image changes depending on a misalignment amount and density unevenness is recognized in some cases.

Moreover, in recent years, there is a technique of printing an image at a higher resolution by using a print head in which two nozzle rows, formed by aligning multiple nozzles configured to eject ink of the same color, are arranged while being shifted in a direction of the alignment. If print misalignment occurs between the two nozzle rows in this case, a dot pattern formed by these two nozzle rows becomes unstable and hue unevenness and density unevenness are recognized in some cases.

SUMMARY OF THE INVENTION

The present invention is made to solve the aforementioned problems. Accordingly, an object thereof is to suppress hue unevenness and density unevenness and print a high-quality image in a printing apparatus configured to print an image in bidirectional multipass printing by using multiple nozzle rows configured to apply printing material of the same color.

In a first aspect of the present disclosure, there is provided a printing method comprising: a step of forming a first dot pattern in a predetermined region on a print medium by causing a printing unit to perform a forward scan in a main scanning direction intersecting a predetermined direction, the printing unit including a first print element row in which print elements configured to apply printing material are aligned at a predetermined resolution in the predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution; and a step of forming a second dot pattern in the predetermined region by causing the printing unit to perform a backward scan in the opposite direction to that of the forward scan, wherein in the first dot pattern in a first dot array that is any dot array printed by print elements of one of the first print element row and the second print element row to be aligned in the main scanning direction, first dot groups, each formed of N1 ($N1 \geq 2$) dots arranged A1 pixels away from each other in the main scanning direction, are arranged at an interval of B1 pixels ($B1 \geq A1 \times N1$), and in a second dot array that is a dot array adjacent to the first dot array in the predetermined direction and printed by the print elements of the other one of the first print element row and the second print element row to be aligned in the main scanning direction, the first dot groups are arranged at an interval of B1 pixels while being shifted relative to the first dot array by C1 pixels ($A1 \times (N1-1) < C1 < B1 - A1 \times (N1-1)$) in the main scanning direction, in the second dot pattern in a third dot array that is any dot array printed by the print elements of one of the first print element row and the second print element row to be aligned in the main scanning direction, second dot groups, each formed of N2 ($N2 \geq 2$) dots arranged A2 pixels away from each other in the main scanning direction, are arranged at an interval of B2 pixels ($B2 \geq A2 \times N2$), and in a fourth dot array that is a dot array adjacent to the third dot array in the predetermined direction and printed by the print elements of the other one of the first print element row and the second print element row to be aligned in the main scanning direction, the second dot groups are arranged at an interval of B2 pixels while being shifted relative to the third dot array by C2 pixels ($A2 \times (N2-1) < C2 < B2 - A2 \times (N2-1)$) in the main scanning direction, and C1 and C2 are different from each other.

In a second aspect of the present disclosure, there is provided a non-transitory computer-readable storage medium storing a program for causing one or more processors of a computer to execute an information processing method, the information processing method comprising: a step of forming a first dot pattern in a predetermined region on a print medium by causing a printing unit to perform a forward scan in a main scanning direction intersecting a predetermined direction, the printing unit including a first print element row in which print elements configured to apply printing material are aligned at a predetermined resolution in the predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution; and a step of forming a second dot pattern in the predetermined region by causing the printing unit to perform a backward scan in the opposite direction to that of the forward scan, wherein in the first dot pattern in a first dot array that is any dot array printed by print elements of one of the first print element row and the second print element row to be aligned in the main scanning direction, first dot groups, each formed of N1 ($N1 \geq 2$) dots arranged A1 pixels away from each other in the main scanning direction, are arranged at an interval of B1 pixels ($B1 \geq A1 \times N1$), and in a second dot array that is a dot array adjacent to the first dot array in the predetermined direction and printed by the print elements of the other one of the first print element row and the second print element row to be aligned in the main scanning direction, the first dot groups are arranged at an interval of B1 pixels while being shifted relative to the first dot array by C1 pixels ($A1 \times (N1-1) < C1 < B1 - A1 \times (N1-1)$) in the main scanning direction, in the second dot pattern in a third dot array that is any dot array printed by the print elements of one of the first print element row and the second print element row to be aligned in the main scanning direction, second dot groups, each formed of N2 (N2≥2) dots arranged A2 pixels away from each other in the main scanning direction, are arranged at an interval of B2 pixels (B2≥A2×N2), and in a fourth dot array that is a dot array adjacent to the third dot array in the predetermined direction and printed by the print elements of the other one of the first print element row and the second print element row to be aligned in the main scanning direction, the second dot groups are arranged at an interval of B2 pixels while being shifted relative to the third dot array by C2 pixels (A2×(N2−1)<C2<B2−A2×(N2−1)) in the main scanning direction, and C1 and C2 are different from each other.

In a third aspect of the present disclosure, there is provided a printing apparatus configured to print an image of a predetermined grayscale value on a print medium, comprising: a printing unit including a first print element row in which print elements configured to apply printing material are aligned at a predetermined resolution in a predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution; a first forming unit configured to form a first dot pattern in a predetermined region on the print medium by causing the printing unit to perform a forward scan in a main scanning direction intersecting the predetermined direction; and a second forming unit configured to form a second dot pattern in the predetermined region by causing the printing unit to perform a backward scan in the opposite direction to that of the forward scan, wherein in the first dot pattern in a first dot array that is any dot array printed by print elements of one of the first print element row and the second print element row to be aligned in the main scanning direction, first dot groups, each formed of N1 (N1≥2) dots arranged A1 pixels away from each other in the main scanning direction, are arranged at an interval of B1 pixels (B1≥A1×N1), and in a second dot array that is a dot array adjacent to the first dot array in the predetermined direction and printed by the print elements of the other one of the first print element row and the second print element row to be aligned in the main scanning direction, the first dot groups are arranged at an interval of B1 pixels while being shifted relative to the first dot array by C1 pixels (A1×(N1−1)<C1<B1−A1×(N1−1)) in the main scanning direction, in the second dot pattern in a third dot array that is any dot array printed by the print elements of one of the first print element row and the second print element row to be aligned in the main scanning direction, second dot groups, each formed of N2 (N2≥2) dots arranged A2 pixels away from each other in the main scanning direction, are arranged at an interval of B2 pixels (B2≥A2×N2), and in a fourth dot array that is a dot array adjacent to the third dot array in the predetermined direction and printed by the print elements of the other one of the first print element row and the second print element row to be aligned in the main scanning direction, the second dot groups are arranged at an interval of B2 pixels while being shifted relative to the third dot array by C2 pixels (A2×(N2−1)<C2<B2−A2×(N2−1)) in the main scanning direction, and C1 and C2 are different from each other.

Further features of the present invention will become apparent from the following description of exemplary embodiments with reference to the attached drawings.

BRIEF DESCRIPTION OF THE DRAWINGS

FIGS. 9A and 9B are schematic diagrams for explaining drive timings in an LEv row and an LOd row;

DESCRIPTION OF THE EMBODIMENTS

First Embodiment

Figure 1:
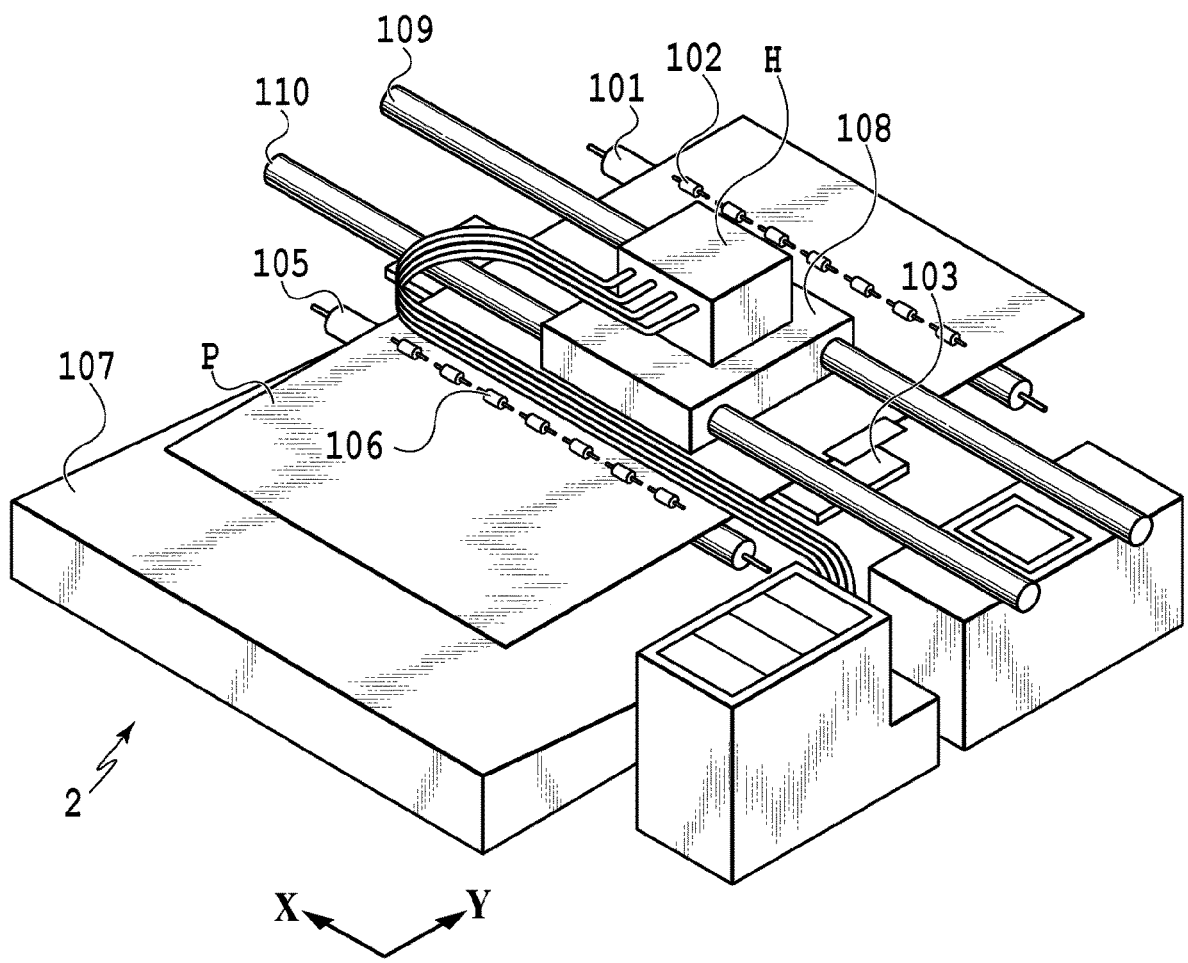
FIG. 1 is a perspective view illustrating an outline of a printing unit in an inkjet printing apparatus.

FIG. 1 is a perspective view illustrating an outline of a printing unit in a serial inkjet printing apparatus 2 (hereinafter, also simply referred to as printing apparatus) applicable to the embodiment. A nipping part including a conveyance roller 101 arranged on a conveyance route and pinch rollers 102 configured to follow the conveyance roller 101 conveys the print medium P fed to the printing portion, in a −Y direction (sub scanning direction) with rotation of the conveyance roller 101.

A platen 103 is provided at the print position facing a surface (nozzle surface) of a print head H of an inkjet type on which nozzles, that is printing elements, are formed and supports the back side of the print medium P from below to maintain a constant distance between the front side of the print medium P and the nozzle surface of the print head H.

The print medium P in a region in which printing is performed on the platen 103 is conveyed in the −Y direction with rotation of a discharge roller 105 while being nipped by the discharge roller 105 and a spur 106 configured to follow the discharge roller 105 and is discharged to a discharge tray 107.

The print head H is detachably mounted on a carriage 108 in such a position that its nozzle surface faces the platen 103 or the print medium P. The carriage 108 is reciprocated in the X direction along two guide rails 109 and 110 by driving force of a carriage motor (not illustrated) and, in the process of this reciprocation, the print head H executes an ejection operation according to an ejection signal.

The ±X directions in which the carriage 108 is moved are directions intersecting the −Y direction in which the print medium P is conveyed and are referred to as the main scanning direction. Meanwhile, the −Y direction of the print medium conveyance is referred to as the sub scanning direction. The main scan (movement involving ejection and applying the color material to the printing medium) of the carriage 108 and the print head H and the conveyance (sub-scan) of the print medium P are alternately repeated and an image is thereby formed on the print medium P step by step.

Figure 2A:
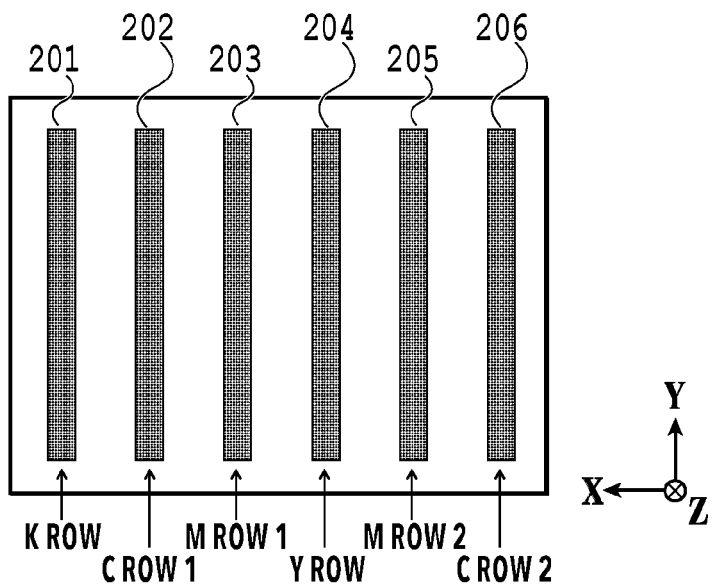
FIGS. 2A to 2C are schematic diagrams of a print head as viewed from the nozzle surface side.
Figure 2B:
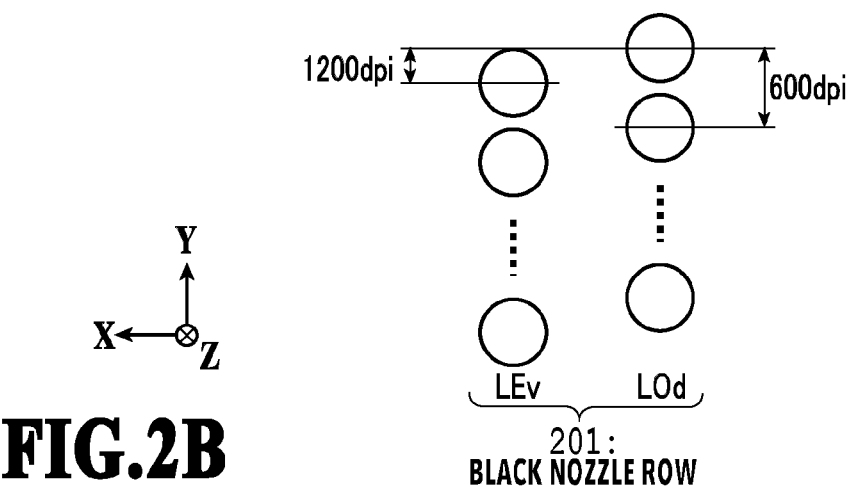
Figure 2C:
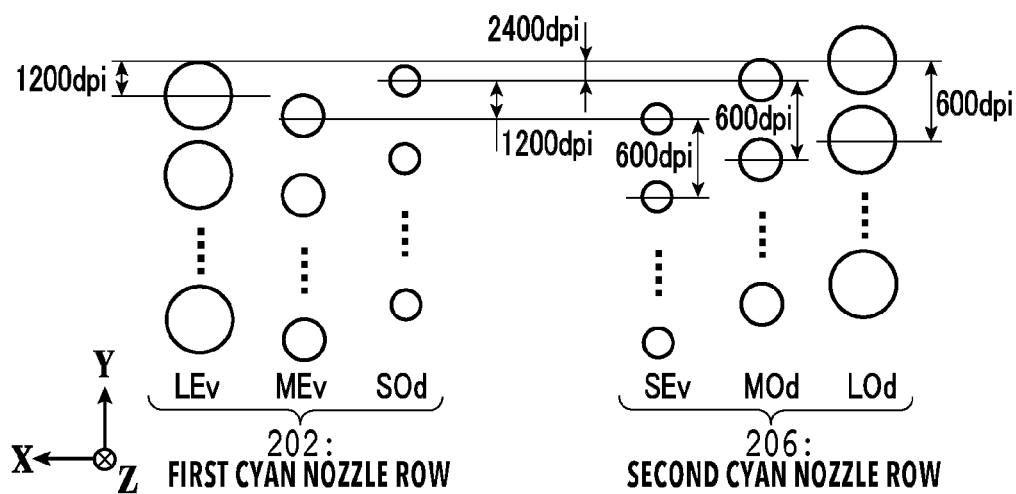

FIGS. 2A to 2C are schematic diagrams illustrating the print head H used in the embodiment as viewed from the nozzle surface side. As illustrated in FIG. 2A, six nozzle rows, that is six printing element rows, are arranged in parallel on the nozzle surface. The nozzle rows are a black nozzle row 201, a first cyan nozzle row 202, a first magenta nozzle row 203, a yellow nozzle row 204, a second magenta nozzle row 205, and a second cyan nozzle row 206 from the left.

FIG. 2B is an enlarged view of the black nozzle row 201. A LEv row and a LOd row are arranged in the black nozzle row 201. The LEv row and the LOd row are each formed by arranging nozzles, configured to eject 5 pl of black ink, in the Y direction at a resolution of 600 dpi. In each of the LEv row and the LOd row, 128 nozzles are aligned and the LEv row is arranged to be shifted by half a pitch in the −Y direction relative to the LOd row. Performing print scan by using the black nozzle row 201 having such a configuration allows black dots with a dot diameter of 50 μm to be printed on the print medium at a print density of 1200 dpi. The yellow nozzle row 204 has the same configuration as the black nozzle row 201.

FIG. 2C is an enlarged view of the first cyan nozzle row 202 and the second cyan nozzle row 206. In the first cyan nozzle row 202, a LEv row configured to eject 5 pl of cyan ink, an MEv row configured to eject 2 pl of cyan ink, and an SOd row configured to eject 1 pl of cyan ink are aligned. Meanwhile, in the second cyan nozzle row 206, a LOd row configured to eject 5 pl of cyan ink, an MOd row configured to eject 2 pl of cyan ink, and an SEv row configured to eject 1 pl of cyan ink are aligned. Each nozzle rows are configured by arranging 128 nozzles in the Y direction at a resolution of 600 dpi. The 5 pl of ink forms a dot with a diameter of about 50 μm, the 3 pl of ink forms a dot with a diameter of about 35 μm, and the 1 pl of ink forms a dot with a diameter of about 20 μm. A heater that is an energy generation element is disposed for each of the nozzles. Applying a voltage pulse to the heater according to print data causes the ink to be ejected from the corresponding nozzle as a droplet.

In the first cyan nozzle row 202 and the second cyan nozzle row 206, the LEv row is arranged to be shifted by half a pitch corresponding to a distance of a resolution (1200 dpi) twice the aligning resolution (600 dpi) in the −Y direction relative to the LOd row, the MEv row relative to the MOd row, and the SEv row relative to the SOd row. Moreover, the MEv row and the MOd row configured to eject 2 pl of cyan ink and the SEv row and the SOd row configured to eject 1 pl of cyan ink are arranged to be shifted by quarter of a pitch (2400 dpi) in the −Y direction relative to the LEv row and the LOd row configured to eject 5 pl of cyan ink. The first magenta nozzle row 203 and the second magenta nozzle row 205 have the same configuration as the first cyan nozzle row 202 and the second cyan nozzle row 206.

Figure 3:
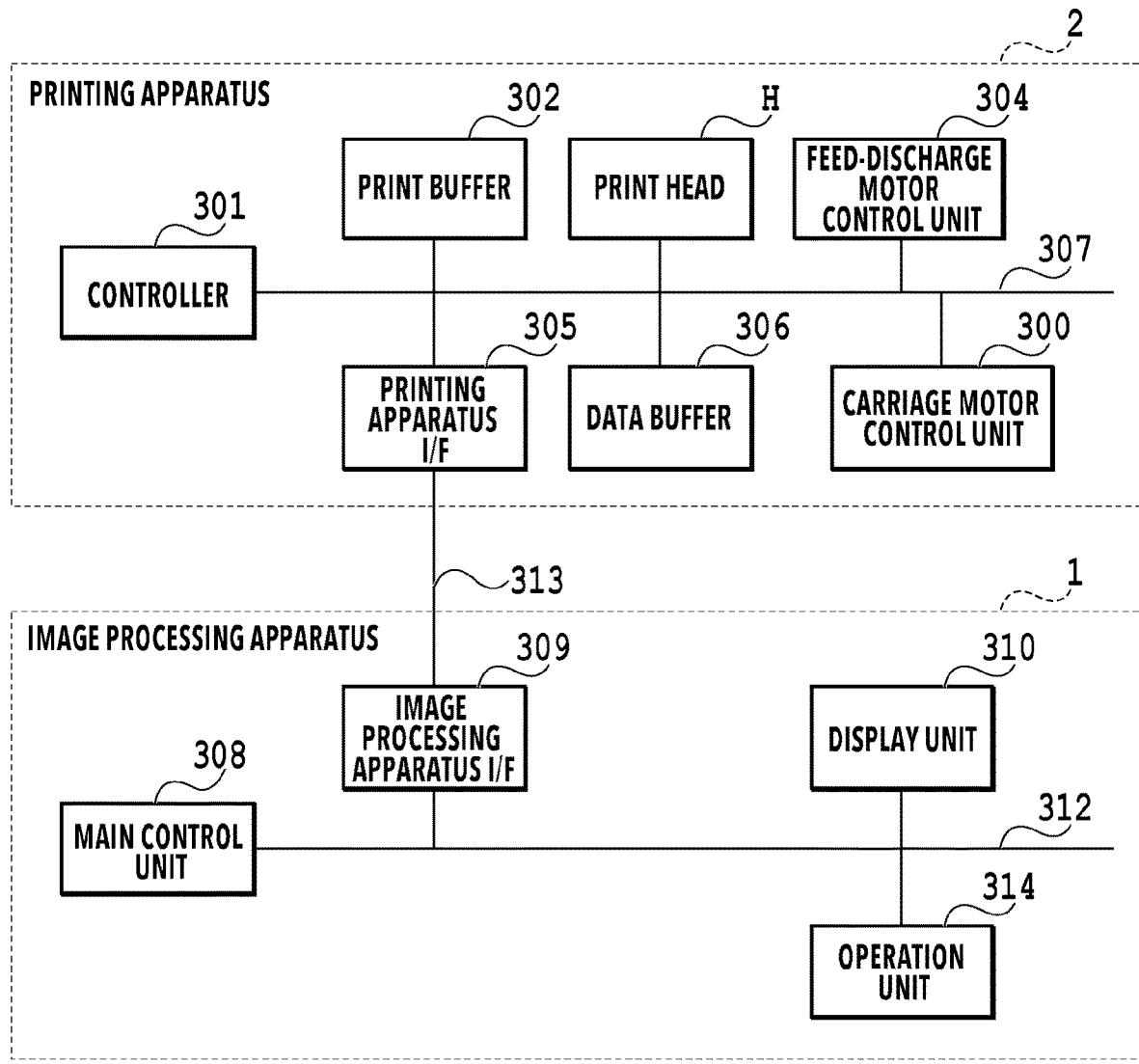
FIG. 3 is a block diagram for explaining a configuration of control of an inkjet printing system.

FIG. 3 is a block diagram for explaining a configuration of control of an inkjet printing system applicable to the embodiment. The inkjet printing system of the embodiment includes the inkjet printing apparatus 2 described in FIG. 1 and an image processing apparatus 1. The image processing apparatus 1 can be, for example, a personal computer (PC).

The image processing apparatus 1 generates image data printable by the printing apparatus 2. In the image processing apparatus 1, a main control unit 308 is formed of a central processing unit (CPU), a read-only memory (ROM), a random access memory (RAM), an application specific integrated circuit (ASIC), or the like and performs image processing and the like in creation of an image in the image processing apparatus 1 and in printing of the created image in the printing apparatus 2. An image processing apparatus I/F 309 exchanges data signals with the printing apparatus 2. A display unit 310 displays various pieces of information to a user and, for example, a liquid crystal display (LCD) or the like is applicable as the display unit 310. An operation unit 314 is an operation unit used by the user to perform operations and, for example, a keyboard and a mouse are applicable as the operation unit 314. A system bus 312 connects the main control unit 308 and various functions to one another. An I/F signal line 313 connects the image processing apparatus 1 and the printing apparatus 2 to each other. For example, a line meeting the specifications of Centronics Data Computer Corp. is applicable as a type of I/F signal line 313.

In the printing apparatus 2, a controller 301 is formed of a CPU, a ROM, a RAM, and the like and controls the entire printing apparatus 2. A print buffer 302 stores image data before transfer to the print head H as raster data. The inkjet print head H ejects the inks from the nozzles according to the image data stored in the print buffer 302.

A feed-discharge motor control unit 304 drives a not-illustrated conveyance motor and controls conveyance, feeding, and discharge of the print medium P. A carriage motor control unit 300 drives a not-illustrated carriage motor and controls forward and backward scans of the carriage 108. A data buffer 306 temporarily stores the image data received from the image processing apparatus 1. A system bus 307 connects the functions of the printing apparatus 2 to one another.

Figure 4:
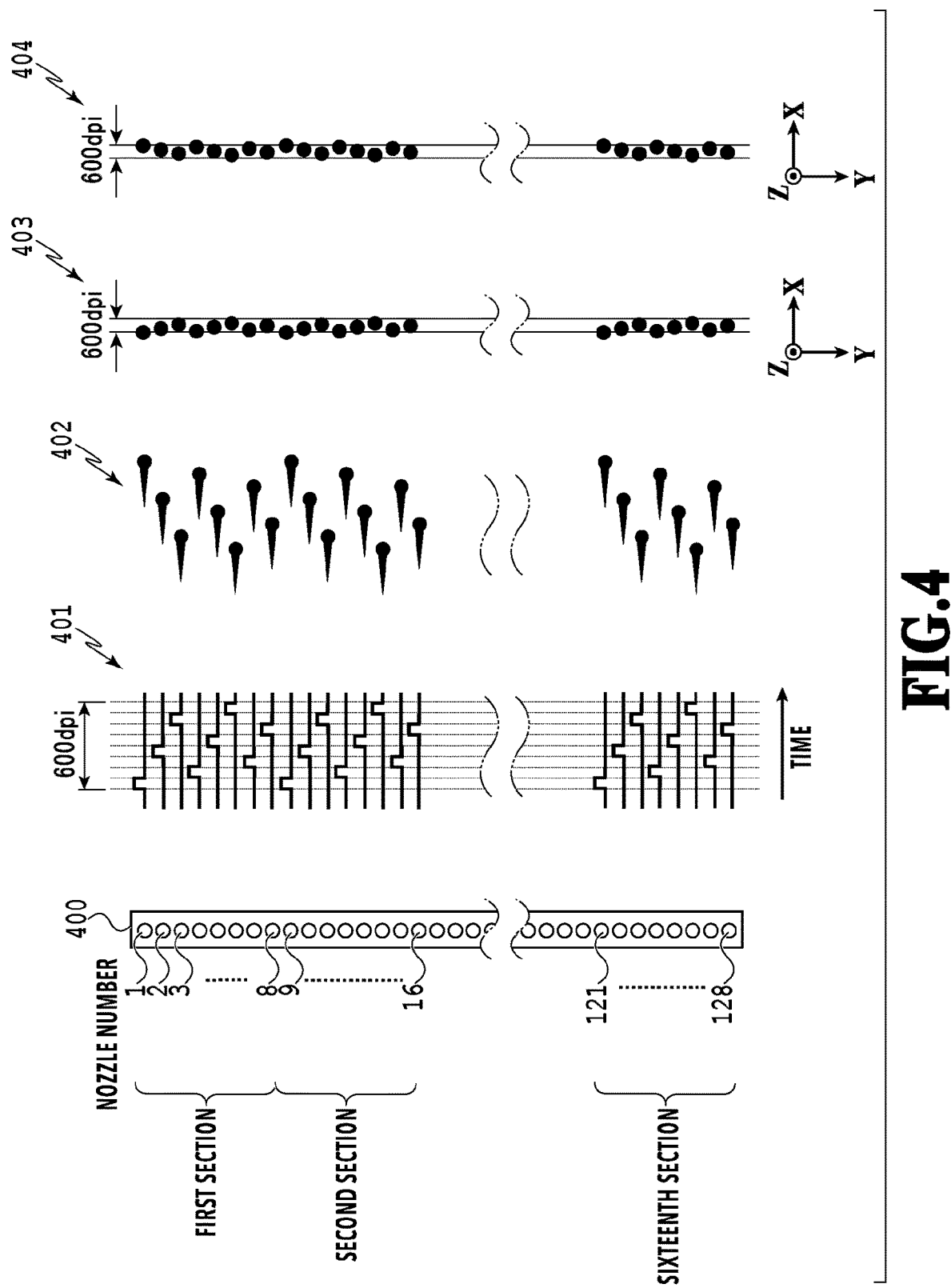
FIG. 4 is a diagram for explaining a driving method of the print head.

FIG. 4 is a diagram for explaining a driving method of the print head H. In the embodiment, there is performed time divisional driving in which 128 nozzles aligned in the same nozzle row are divided into eight blocks and timings at which the voltage pulses are applied to the heaters in each block are shifted from one another. Details are described below.

In a nozzle row 400, all 128 nozzles are divided into 16 sections each including eight consecutive nozzles. The nozzles included in each section are assigned to eight blocks of a block 1, a block 2, . . . , and a block 8, from the first nozzle in the −Y direction.

A timing chart 401 illustrates a drive timing of each nozzle. In the timing chart 401, the horizontal axis represents time and the vertical axis represents voltage applied to the heater disposed for each nozzle. In each section, the nozzles are driven in the order of the first nozzle, the fourth nozzle, the seventh nozzle, the second nozzle, . . . in periods obtained by dividing a period corresponding to one pixel in 600 dpi by eight. The 16 nozzles included in the same block are simultaneously driven. Since the drive timings of the nozzles are reflected to ejection timings, ink droplets proceeding toward the print medium are as illustrated in an ejection state 402.

In the case where the carriage 108 (see FIG. 1) is moved in the +X direction under such drive control, a dot pattern 403 is formed on the print medium. Since the ejection is performed while the carriage 108 is moved in the X direction, dots are arranged to be shifted from one another in the X direction depending on the driving order. To be more specific, assuming that regions obtained by dividing one pixel region in 600 dpi by eight are each one section, dots printed by three nozzles adjacent to one another such as the first to third nozzles are arranged to be shifted from one another by three sections. Accordingly, an oblique line tilted with respect to the X direction is repeatedly arranged in the Y direction on the print medium.

Meanwhile, in the case where the carriage 108 is moved in the −X direction under the aforementioned drive control, a dot pattern 404 is formed on the print medium. In the dot pattern 404, the direction of the tilt of the oblique lines is opposite to that in the dot pattern 403 in the forward scan in the left-right direction.

Performing the time divisional driving as described above can reduce the number of nozzles simultaneously driven and enables reduction of a power source capacity. Meanwhile, slight variation in print positions of dots occurs in one pixel region in 600 dpi as illustrated in the dots patterns 403 and 404.

Figure 5:
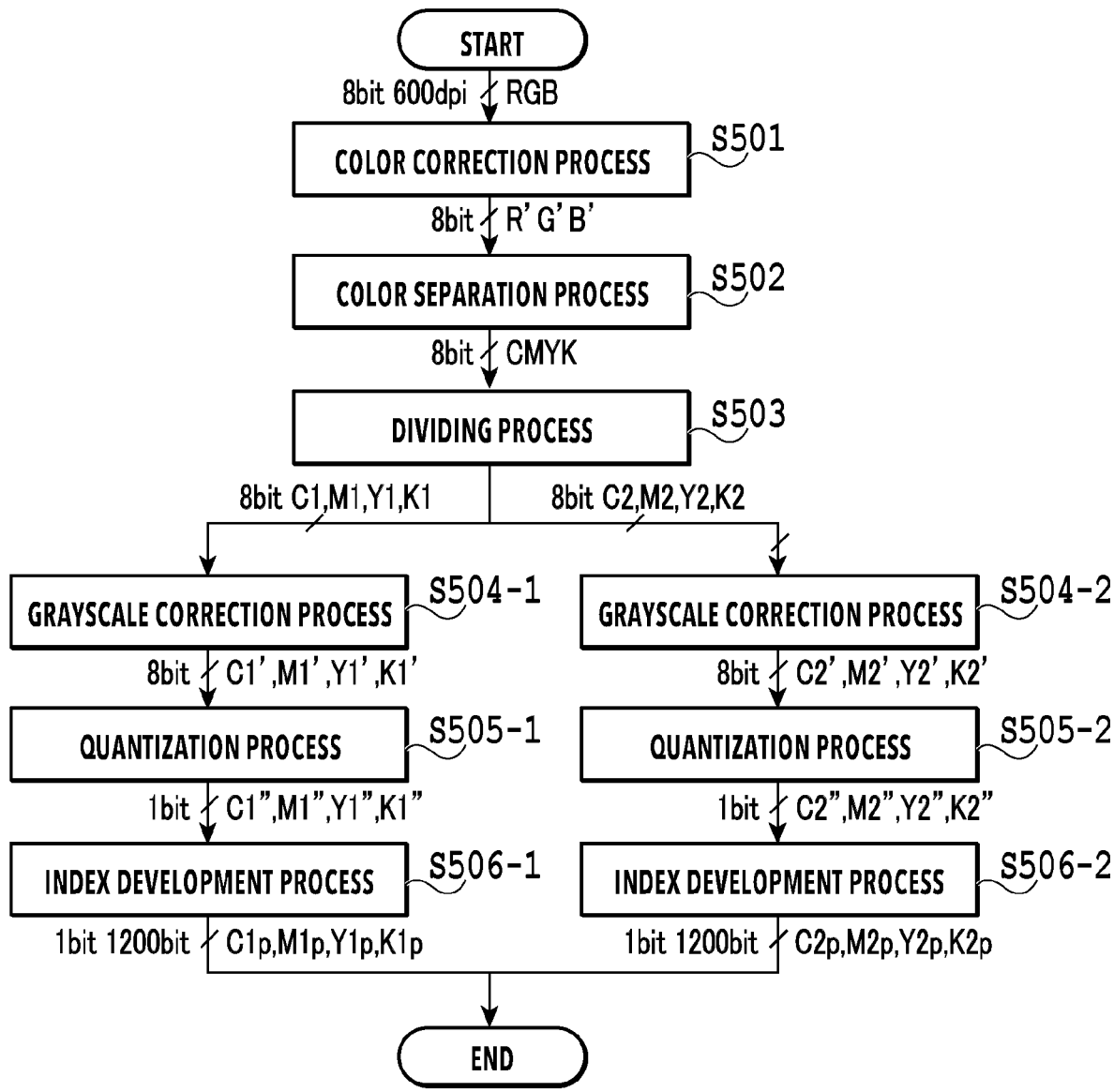
FIG. 5 is a flowchart for explaining processing executed by a main control unit.

FIG. 5 is a flowchart for explaining processing executed by the main control unit 308 of the image processing apparatus 1 in printing of any image with the printing apparatus 2. This processing starts in the case where the user inputs a print command of any image.

In the case where this processing is started, the main control unit 308 first performs a color correction process in step S501. In the embodiment, the image data generated by an application or the like is assumed to be data in which each of pixels arranged at 600 dpi has a 8-bit, 256-level brightness value for each of R (red), G (green), and B (blue). In the color correction process, the main control unit 308 converts such RGB data of each pixel to R'G'B' data expressed in a color space unique to the printing apparatus 2. For example, as a specific conversion method, the conversion can be performed by referring to a look-up table stored in advance in a memory.

In step S502, the main control unit 308 performs a color separation process on the R'G'B' data. Specifically, the main control unit 308 refers to a look-up table stored in advance in the memory and converts the brightness values R'G'B' of each pixel to 8-bit, 256-level density values CMYK corresponding to the ink colors used by the printing apparatus 2.

In step S503, the main control unit 308 performs a dividing process on the 8-bit, 256-level CMYK data and generates pieces of density data C1, M1, Y1, and K1 for the forward scan and pieces of density data C2, M2, Y2, and K2 for the backward scan. In this case, the main control unit 308 may substantially equally divide the density value of each color indicated in the CMYK data into two.

The same processes are performed in parallel for each ink color in processes after steps S504-1 and S504-2. In this section, only the processes for the cyan data (C1 and C') are described herein for simplification.

In steps S504-1 and S504-2, the main control unit 308 performs a grayscale correction process on each of the density values C1 and C2. The grayscale correction process is correction performed to achieve a linear relationship between the inputted density value and an optical density expressed on the print medium P. Generally, the grayscale correction process is performed by referring to a one-dimensional look-up table prepared in advance. The 8-bit, 256-level density values C1 and C2 are converted to 8-bit, 256-level C1' and C2' by the grayscale correction process in steps S504-1 and S504-2.

In steps S505-1 and S505-2, the main control unit 308 performs a predetermined quantization process on each of pieces of multi-valued data C1' and C2' and generates quantized data C1" for the forward scan and quantized data C2" for backward scan. The quantized data C1" is a 1-bit binary data indicating print (1) or non-print (0) for each pixel in the forward scan. The quantized value C2" is a 1-bit binary data indicating print (1) or non-print (0) for each pixel in the backward scan.

In steps S506-1 and S506-2, the main control unit 308 performs an index development process. In the index development process of the embodiment, the main control unit 308 converts the pieces of binary data C1" and C2" for 600×600 dpi into pieces of binary data C1$p$ and C2$p$ for 600×1200 dpi by using an index pattern prepared in advance. Specifically, a region of one pixel in the X direction×one pixel in the Y direction is divided to form a region of one pixel in the X direction×two pixels in the Y direction and print (1) or non-print (0) of the dot is set for each of the pixels.

Pieces of binary data C1$p$, M1$p$, Y1$p$, and K1$p$ for forward scan and pieces of binary data C2$p$, M2$p$, Y2$p$, and K2$p$ for backward scan generated in the image processing apparatus are sent to the printing apparatus 2. The controller 301 of the printing apparatus 2 performs predetermined multipass printing according to the received binary data.

Note that, although the dividing process for dividing the data into the data for forward scan and the data for backward scan is performed between the color separation process and the grayscale correction process in the flowchart of FIG. 5, the dividing process may be performed after the grayscale correction.

Figure 6:
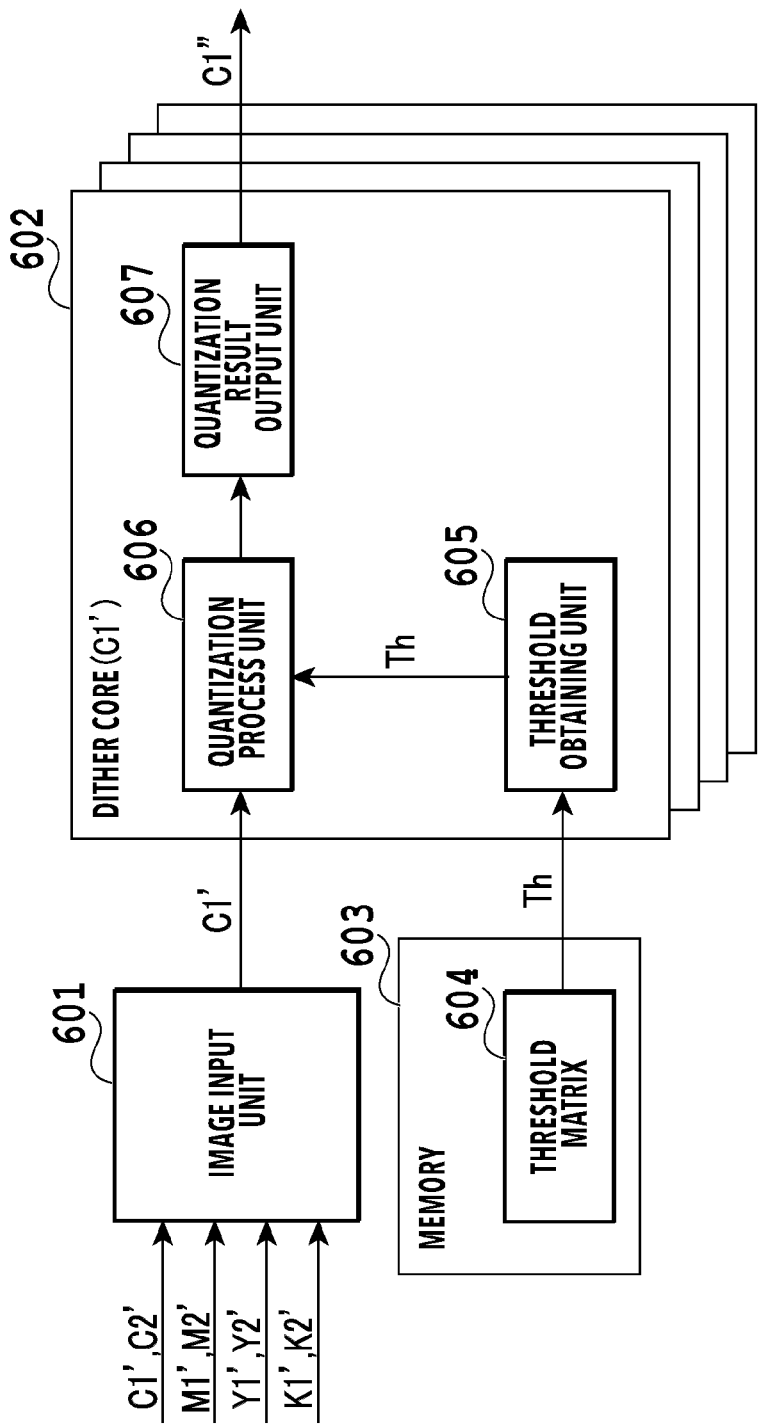
FIG. 6 is a functional block diagram for achieving a quantization process.

FIG. 6 is a functional block diagram for achieving the quantization process executed in steps S505-1 and S505-2 of FIG. 5. Blocks illustrated in FIG. 6 are implemented by the main control unit 308 of the image processing apparatus 1 described in FIG. 3.

An image input unit 601 sends the pieces of 256-level grayscale data C1', C2', M1', M2', Y1', Y2', K1', and K2' subjected to the grayscale correction process to dither cores 602 prepared for the respective pieces of grayscale data. Although FIG. 6 illustrates a configuration of the dither core 602 for C1', similar dither cores 602 are prepared also for the other pieces of grayscale data.

Multiple threshold matrices 604 corresponding to the respective pieces of grayscale data C1', C2', M1', M2', Y1', Y2', K1', and K2' are stored in advance in a memory 603. The threshold matrices 604 are matrices that store thresholds in association with pixel positions of individual pixels and can be generated by using a computer and stored in the memory 603 in advance.

A threshold obtaining unit 605 refers to the threshold matrix 604 corresponding to C1', obtains a threshold Th, corresponding to the pixel position of C1' received by the dither core 602, from the threshold matrix 604, and provides the threshold Th to a quantization process unit 606. The quantization process unit 606 compares the grayscale value C1' of the pixel to be processed received from the image input unit 601 and the threshold Th provided by the threshold obtaining unit 605 and determines print (1) or non-print (0) of a dot for the pixel to be processed. A quantization result output unit 607 outputs information of print (1) or non-print (0) determined by the quantization process unit 606 as the quantized data C1" for the pixel to be processed.

Figure 7A:
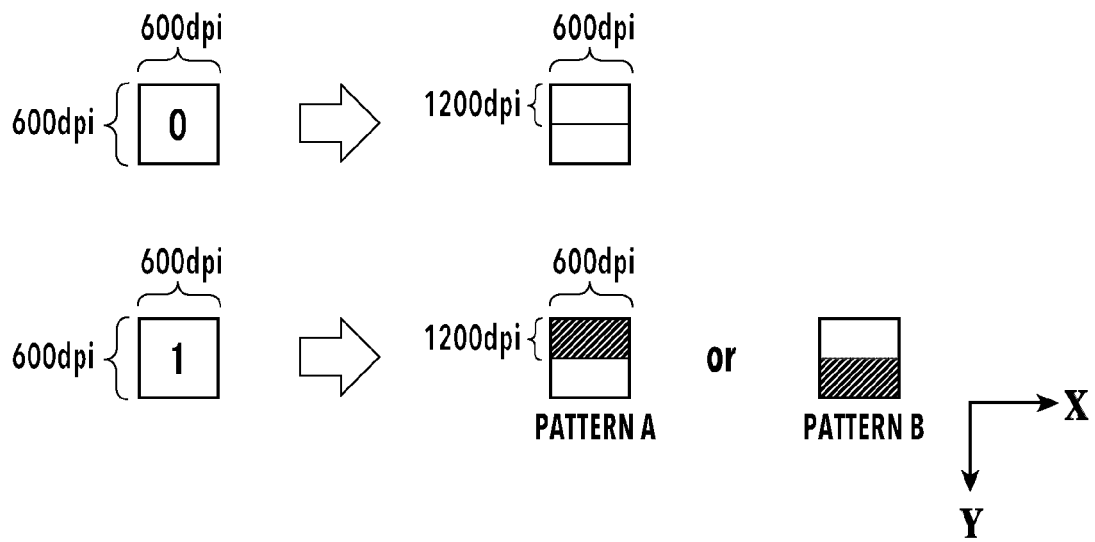
FIGS. 7A and 7B are diagrams illustrating a dot arrangement pattern and an index pattern.
Figure 7B:
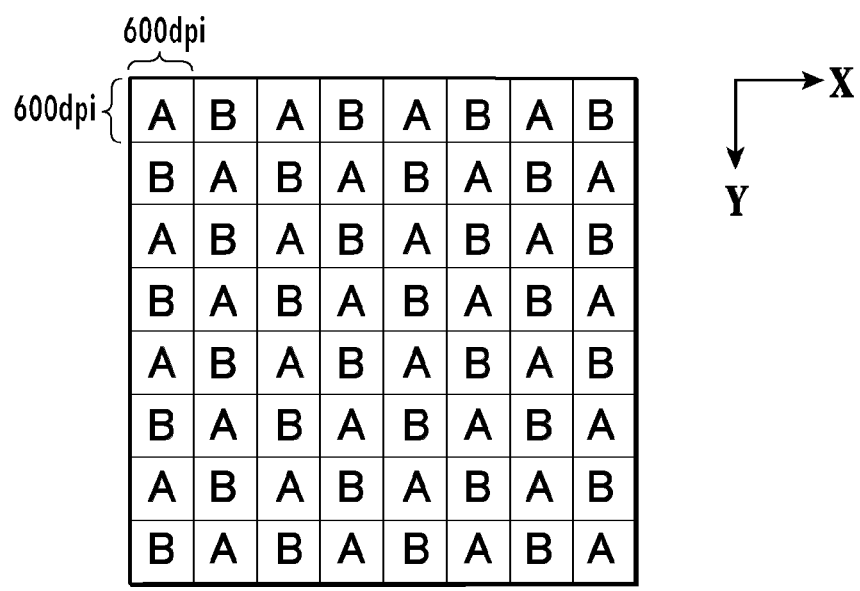

FIGS. 7A and 7B are diagrams illustrating dot arrangement patterns and index patterns used in the index development process in steps S506-1 and S506-2 of FIG. 5. FIG. 7A is a diagram illustrating the dot arrangement patterns. One pixel region in 600×600 dpi is associated with two pixel regions in 600×1200 dpi. In the case where the quantized data C1" or C2" for one pixel in 600×600 dpi is "0", specifically indicates non-print of a dot, no dot is arranged for both pixels in 600×1200 dpi. Meanwhile, in the case where the quantized data C1" or C2" for one pixel in 600×600 dpi is "1", specifically indicates print of a dot, two positions are conceivable as a position for actually printing the dot. In the embodiment, there are prepared a pattern A in which the dot is arranged for an upper pixel, specifically, a pixel on the −Y direction side and a pattern B in which the dot is arranged for a lower pixel, specifically, a pixel on the +Y direction side. In the dot arrangement patterns of the embodiment, the nozzles in the LEv row print dots for the upper pixels and the nozzles in the LOd row print dots for the lower pixels (see FIG. 2C).

FIG. 7B is a diagram illustrating an example of the index pattern. In the index pattern, each square corresponds to one pixel region in 600×600 dpi. For each pixel, the index pattern defines in which one of the patterns A and B the dot is to be arranged in the case where the quantized value for the corresponding pixel is "1". In the embodiment, the index pattern used in the index development process in step S506-1 is different from the index pattern used in the index development process in step S506-2.

Figure 8:
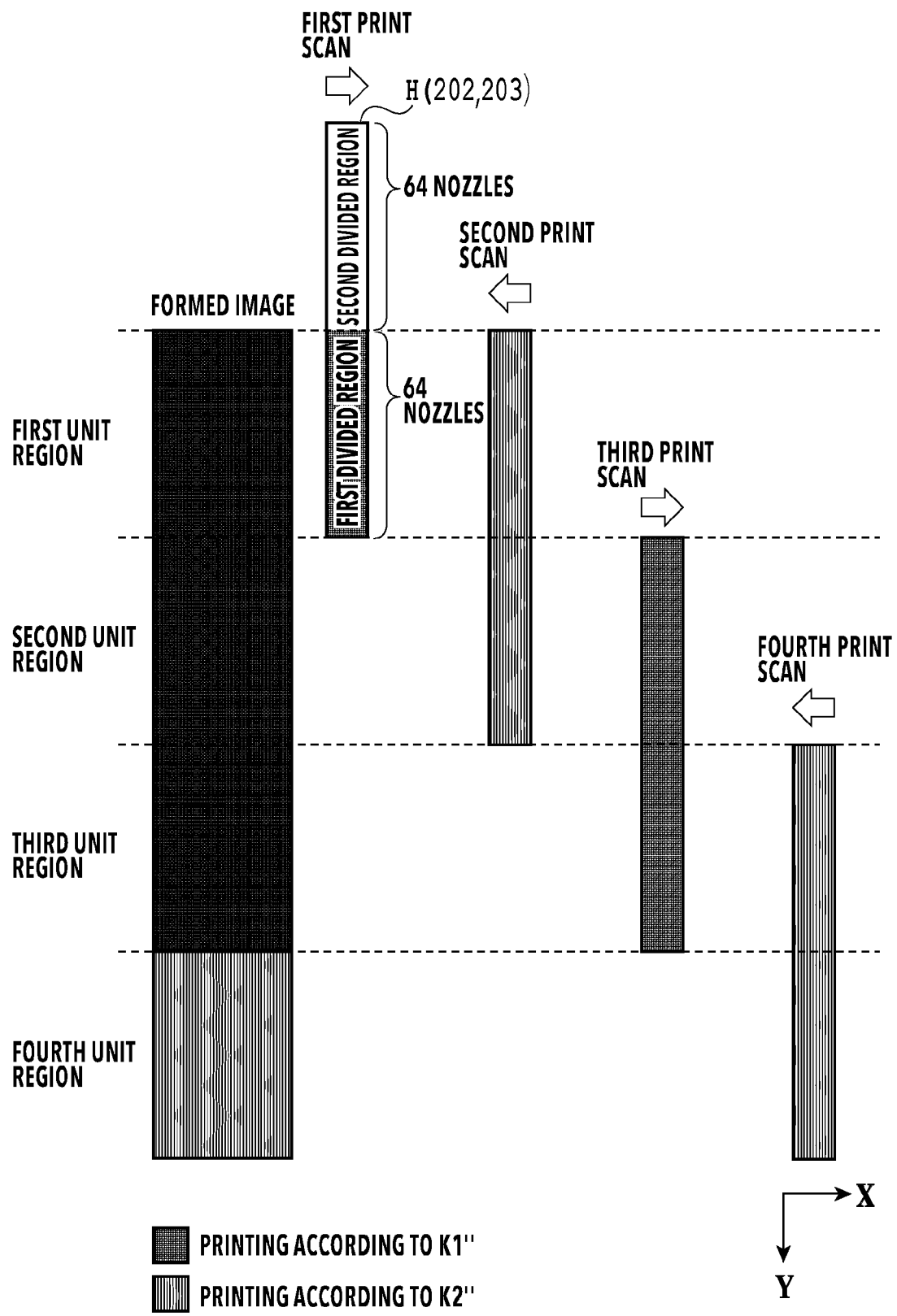
FIG. 8 is a schematic diagram for explaining bidirectional two-pass multipass printing.

FIG. 8 is a schematic diagram for explaining bidirectional two-pass multipass printing that is executed in the printing apparatus 2 under control of the controller 301. In FIG. 8, in order to simplify the description, description is given only of the print operations of LEv that is the first cyan nozzle row 202 and LOd (see FIG. 2) that is the second cyan nozzle row 206 among the multiple nozzle rows aligned in the print head H.

In the case where the two-pass multipass printing is performed, 128 nozzles included in each of the nozzle rows LEv and LOd is divided into a first divided region and a second divided region.

In the first print scan, the controller 301 performs the ejection operation according to the binary data C1$p$ by using the first divided region while moving the print head H in the +X direction that is the forward direction. Then, the controller 301 conveys the print medium in the −Y direction by 64 pixels. In FIG. 8, the print head H is moved in the +Y direction to express relative positional relationships between the divided regions and the print medium for the sake of convenience.

In the second print scan, the controller 301 performs the ejection operation according to the binary data C2$p$ by using the first divided region and the second divided region while moving the print head H in the −X direction that is the backward direction opposite to the direction in the first print scan. Then, the controller 301 conveys the print medium in the −Y direction by 64 pixels.

In the third print scan, the controller 301 performs the ejection operation according to the binary data C1$p$ by using the first divided region and the second divided region while moving the print head H in the forward direction. Then, the controller 301 conveys the print medium in the −Y direction by 64 pixels.

Thereafter, a backward scan like the second print scan and a forward scan like the third print scan are repeatedly performed with the conveyance operation of 64 pixels performed between these scans. A dot pattern according to the binary data C1$p$ printed in the forward scan and a dot pattern according to the binary data C2$p$ printed in the backward scan are thereby printed in an overlapping manner in each unit region of the print medium. In the following description, the dot pattern according to the binary data C1$p$ printed in the forward scan is referred to as the first dot pattern and the dot pattern according to the binary data C2$p$ printed in the backward scan is referred to as the second dot pattern.

FIGS. 9A and 9B are schematic diagrams for explaining detailed drive timings in the LEv row that is the first cyan nozzle row 202 and the LOd row that is the second cyan nozzle row 206 in the forward and backward print scans. FIG. 9A illustrates drive timings in the forward scan and FIG. 9B illustrates drive timings in the backward scan.

In the forward scan, first, the LEv row is driven in the aforementioned time divisional driving at a timing at which the LEv row reaches a reference position. Then, the LOd row is not driven at a timing at which the LOd row reaches a reference position. Instead, the LOd row is driven in the time divisional driving at a timing at which the LOd row reaches a shifted position away from the reference position by 1200 dpi+600 dpi÷8×1.5(≈29.1 μm).

In the backward scan, first, the LOd row is not driven at a timing at which the LOd row reaches the reference position. Instead, the LOd row is driven in the time divisional driving at a timing at which the LOd row reaches a shifted position away from the reference position by 1200 dpi+600 dpi÷8×1.5(≈29.1 μm). Then, the LEv row is driven in the time divisional driving at a timing at which the LEv row reaches the reference position.

Meaning of shifting by 1200 dpi+600 dpi÷8×1.5 is described. As described above, the LEv row and LOd row each having a resolution of 600 dpi are arranged to be shifted from each other by half a pitch in the Y direction. Accordingly, superimposing of the LEv row and the LOd row causes dots to be aligned at a pitch of 1200 dpi in the Y direction. However, since the resolution of the grayscale value data that is the input data is 600 dpi, alignment density of dots in the X direction and that in the Y direction become uneven if the grayscale value data is printed as it is. Thus, the drive timing of the LOd row is shifted by half a pitch relative to the LEv row to allow the dots in the LEv row and the dots in the LOd row to be evenly arranged in the X and Y directions.

Moreover, in the embodiment, the dots in the LEv row and the dots in the LOd row are arranged to be tilted due to the time divisional driving described in FIG. 4. Accordingly, in the embodiment, the drive timings are further shifted by 1.5 times the distance (600 dpi÷8) corresponding to such tilt and a preferable pattern in which dots are uniformly distributed is thereby formed on the print medium.

Note that, in the embodiment, the shifting of (600 dpi÷8×1.5) is unnecessary in the case where shifting of 1200 dpi can be achieved. Moreover, although the contents in which the drive timing of the LOd row is shifted (delayed) relative to that of the LEv row is described above, the same effects can be obtained also by forwarding the drive timing of the LEv row relative to that of the LOd row. Furthermore, the nozzle row whose drive timing is shifted in the forward scan and that in the backward scan may be switched between the LEv row and the LOd row.

Figure 10A:
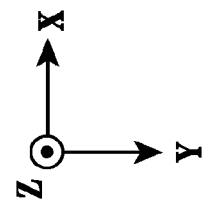
FIGS. 10A and 10B are diagrams illustrating an example of the threshold matrices.
Figure 10B:
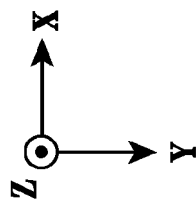

FIGS. 10A and 10B are diagrams illustrating examples of the threshold matrices stored in the memory 603. A first threshold matrix 1001 for forward scan and a second threshold matrix 1002 for backward scan are prepared as the threshold matrices.

In FIGS. 10A and 10B, individual squares correspond respectively to pixels arranged on an XY plane and a value described in each square indicates the threshold of the corresponding pixel position. In the embodiment, since C1' and C2' each have one of values of 0 to 255, each threshold Th is set to one of values of 0 to 254. In the case where C1'>Th in the pixel to be processed, the quantized value C1" of the pixel to be processed is set to print (C1"=1). Meanwhile, in the case where C1'≤Th, the quantized value C1" of the pixel to be processed is set to non-print (C1"=0). The same applies to a relationship between C2' and C2".

In the embodiment, the first and second threshold matrices 1001 and 1002 each having a region of 32 pixels×32 pixels as illustrated in FIGS. 10A and 10B are prepared and are used by being repeatedly arranged in the X direction and the Y direction in the forward scan and the backward scan, respectively. The first threshold matrix 1001 and the second threshold matrix 1002 are in a symmetrical relationship in the X direction.

Figure 11:
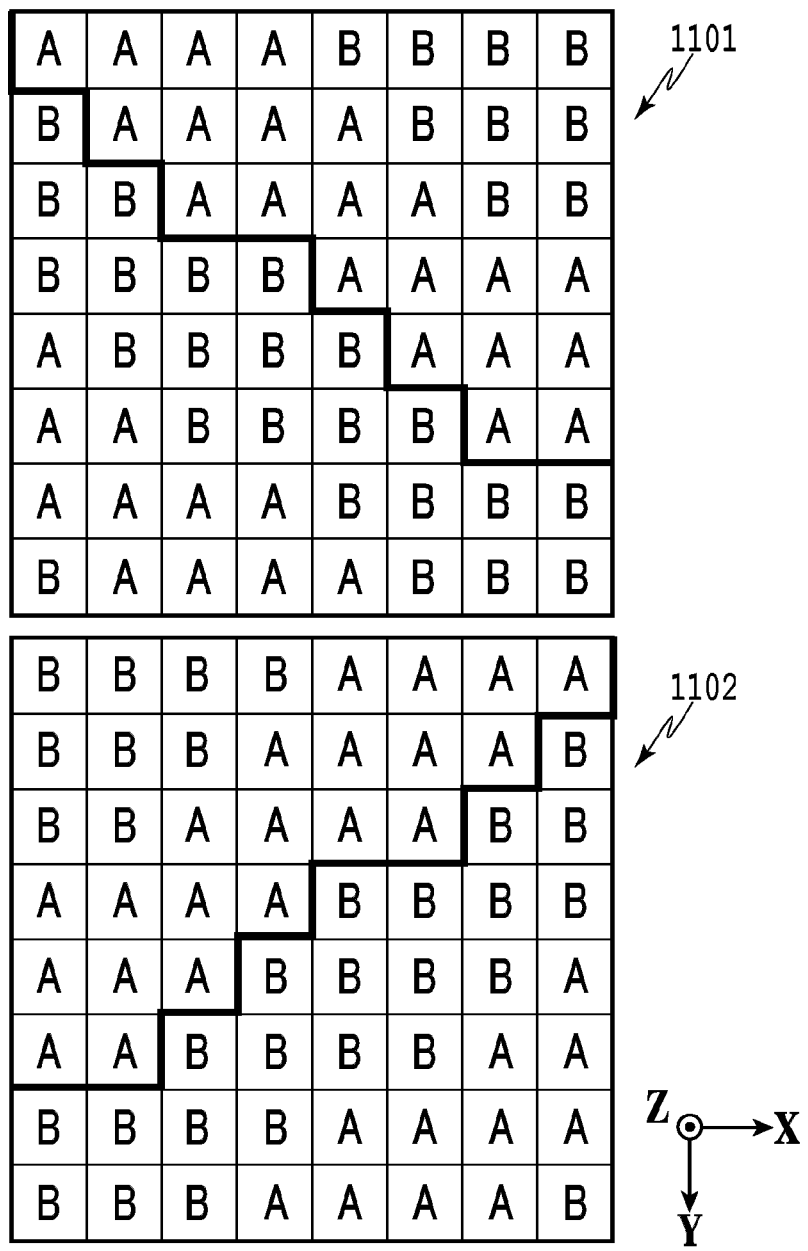
FIG. 11 is a diagram illustrating an example of index patterns.

FIG. 11 is a diagram illustrating an example of index patterns used in the embodiment. A first index pattern 1101 for forward scan and a second index pattern 1102 for backward scan are prepared as the index patterns.

In FIG. 11, individual squares correspond respectively to the pixels arranged on the XY plane and each square corresponds to one pixel region in 600×600 dpi. For each pixel, the index pattern defines in which one of the patterns A and B the dot is to be arranged in the case where the quantized value for the corresponding pixel is "1" (see FIG. 7A).

In the following description, a group of pixels at the same pixel position in the Y direction is referred to as raster. If we look into the first raster of the first index pattern 1101 and view it in the +X direction, the pattern A is set for the first four pixels and the pattern B is set for the next four pixels. In the second raster, the contents of the first raster are set while being shifted by one pixel in the +X direction. In the third raster, the contents of the second raster are set while being further shifted by one pixel in the +X direction. In the fourth raster, the contents of the third raster are set while being shifted by two pixels, instead of one pixel, in the +X direction. In the fifth raster and beyond, shifting as described above is repeatedly performed.

Repeatedly arranging, in the Y direction, two rasters in each of which the contents of the raster immediately above is shifted by one pixel in the +X direction and one raster in which the contents of the raster immediately above is shifted by two pixels in the +X direction can correct misalignment of the oblique lines that occurs at a cycle of three dots as described in FIG. 4.

Next, if we look into the second index pattern 1102, the second index pattern 1102 is a pattern obtained by inverting the first index pattern 1101 in the X direction. Specifically, in the second raster, the contents of the first raster are set to be shifted by one pixel in the −X direction. Moreover, in the third raster, the contents of the second raster are set to be shifted by one pixel in the −X direction and, in the fourth raster, the contents of the third raster are set to be shifted by two pixels in the −X direction. In the fifth raster and beyond, shifting as described above is repeatedly performed.

Repeatedly arranging, in the Y direction, two rasters in each of which the contents of the raster immediately above is shifted by one pixel in the −X direction and one raster in which the contents of the raster immediately above is shifted by two pixels in the −X direction can correct misalignment of the oblique lines that occurs at a cycle of three dots as described in FIG. 4.

Figure 12A:
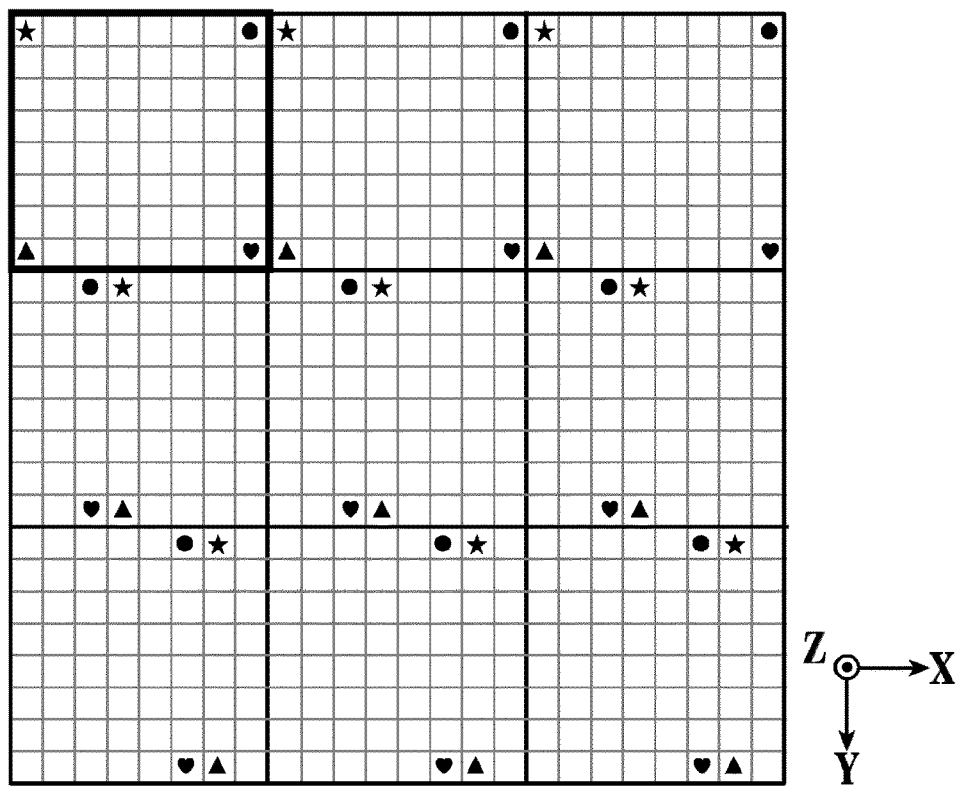
FIGS. 12A and 12B are diagrams for explaining arrangement control of the index patterns.
Figure 12B:
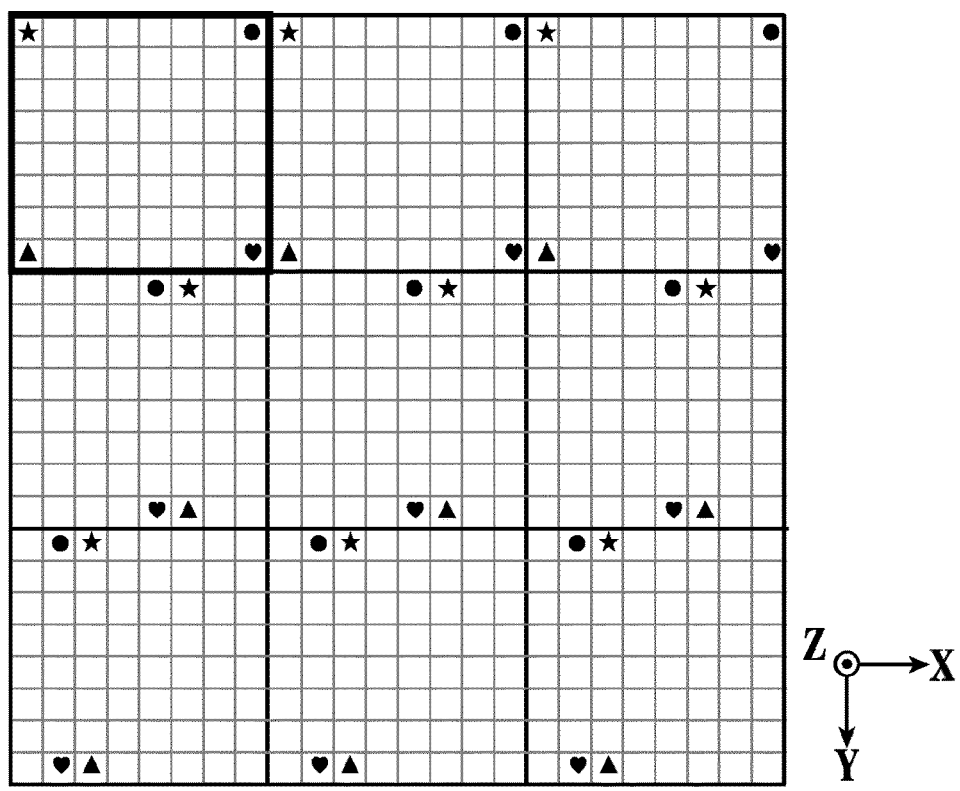

FIGS. 12A and 12B are diagrams for explaining arrangement control of each of the first index pattern 1101 and the second index pattern 1102 executed by the main control unit 308 in the index development process in steps S506-1 and S506-2.

FIG. 12A illustrates an arrangement state of the first index pattern 1101 in step S506-1. The first index pattern 1101 is repeatedly used in the X direction for the first eight rasters. For every set of eight subsequent rasters, the first index pattern 1101 is shifted by three pixels in the X direction and repeatedly used in the X direction.

FIG. 12B illustrates an arrangement state of the second index pattern 1102 in step S506-2. The second index pattern 1102 is repeatedly used in the X direction for the first eight rasters. For every set of eight subsequent rasters, the second index pattern 1102 is shifted by three pixels in the X direction and repeatedly used in the X direction.

Preparing the first index pattern 1101 and the second index pattern 1102 in the symmetrical relationship and symmetrically arranging these patterns in the X direction as described above can correct misalignment of the oblique lines caused by the time divisional driving in the entire image region. As a result, a preferable dot pattern with excellent dispersiveness can be printed in both of the backward scan and the forward scan.

Next, specific description is given of dot patterns formed in the case where the image processing is performed by using the first and second threshold matrices 1001 and 1002 and the first and second index patterns 1101 and 1102.

Figure 13A:
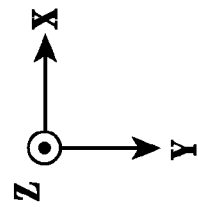
FIGS. 13A and 13B are diagrams illustrating results of the quantization process.
Figure 13B:
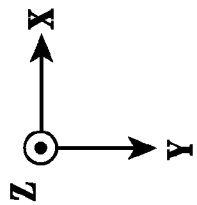

FIGS. 13A and 13B are diagrams illustrating results of the quantization process in steps S505-1 and S505-2 in the case where grayscale data of C1'=C2'=128 is inputted for a region of 32 pixels×32 pixels in 600 dpi. In each of the first threshold matrix 1001 and the second threshold matrix 1002, pixels illustrated in black correspond to pixels for which the quantized values are set to print (C1"=1, C2"=1). Since the first threshold matrix 1001 and the second threshold matrix 1002 are in the symmetrical relationship in the X direction, the arrangement of the black pixels in the first threshold matrix 1001 and the arrangement of the black pixels in the second threshold matrix 1002 are also in the symmetrical relationship in the X direction.

In the case where the rasters are offset according to the following rules, the first threshold matrix 1001 and the second threshold matrix 1002 illustrated in FIGS. 13A and 13B have zigzag patterns (checkered pattern) in which the black pixels are uniformly arranged. Specifically, a raster in which the remainder of R−1 divided by 8 is 0, 1, or 2 is offset by 0+{quotient of (R−1)÷8} pixels, where R denotes the raster number. A raster in which the aforementioned remainder is 3, 4, or 5 is offset by 1+{quotient of (R−1)÷8} pixels. A raster in which the aforementioned remainder is 6 or 7 is offset by 2+{quotient of (R−1)÷8} pixels. In this case, the offset is made in the −X direction in the first threshold matrix 1001 and in the +X direction in the second threshold matrix 1002.

In the embodiment, oblique lines as illustrated in the dot patterns 403 and 404 in FIG. 4 are formed at a cycle of three dots in the case where the time divisional driving is performed. The aforementioned threshold matrices are matrices in which offset in the opposite direction to the aforementioned offset is intentionally applied to the uniform zigzag threshold arrangement, and are created to correct the dot arrangement unevenness caused by the time divisional driving.

Figure 14:
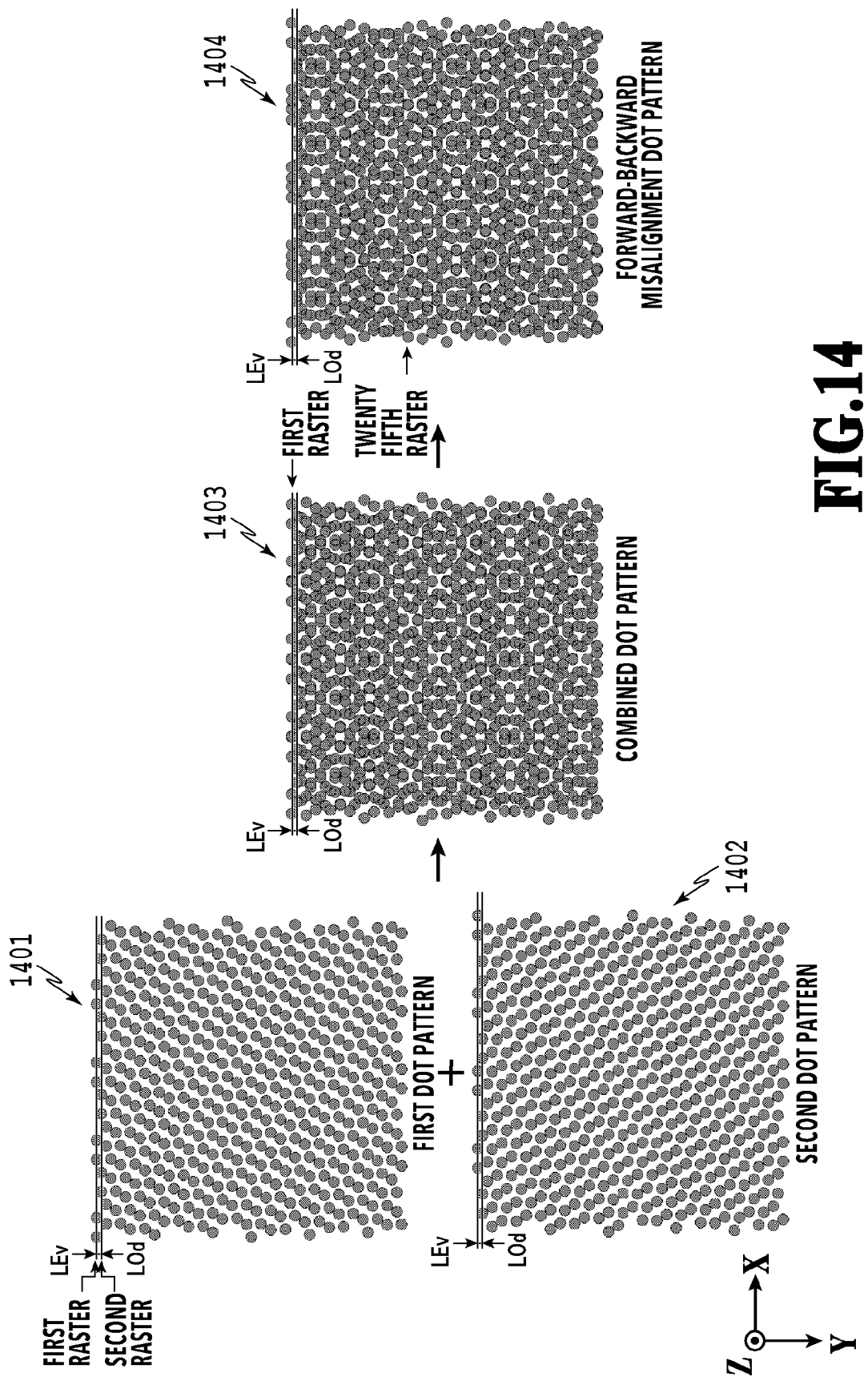
FIG. 14 is a diagram illustrating dot patterns in the case where forward-backward misalignment occurs.

FIG. 14 is a diagram illustrating dot patterns formed on the print medium in the case where the ejection operation is performed while performing the time divisional driving described in FIG. 4 according to the index patterns described in FIGS. 11, 12A, and 12B based on the quantized data illustrated in FIGS. 13A and 13B. A first dot pattern 1401 illustrates a dot pattern printed in the forward scan and a second dot pattern 1402 illustrates a dot pattern printed in the backward scan. Moreover, a combined dot pattern 1403 illustrates a dot pattern in which the first dot pattern 1401 and the second dot pattern 1402 are combined without misalignment. Moreover, a forward-backward misalignment dot pattern 1404 illustrates a state where the second dot pattern 1402 is misaligned relative to the first dot pattern 1401 by one pixel (≈42 μm) in 600 dpi in +X direction. In all dot patterns, dots printed by the LEv row and dots printed by the LOd row are alternately arranged in the Y direction.

If we view the first raster of the first dot pattern 1401 in the +X direction, an arrangement in which two dots printed by the LEv row are disposed side by side and then two dots are disposed side by side again at an interval is repeated four times. Moreover, if we view the second raster in the +X direction, an arrangement in which two dots printed by the LOd row are disposed side by side and then two dots are disposed side by side again at an interval is repeated four times. An interval between the two dots disposed side by side (hereinafter, referred to as dot pair) and a cycle at which the dot pairs are arranged in the X direction are the same between the first raster and the second raster and the same applies to the third raster and beyond. In addition, the positions of the dot pairs in the X direction are shifted by a certain amount in the +X direction as the raster number increases.

Meanwhile, in the second dot pattern 1402, the same dot pairs as those in the first dot pattern 1401 are arranged at the same cycle as that in the first dot pattern 1401 in each raster and the positions of the dot pairs are shifted by a certain amount in the −X direction as the raster number increases.

In comparison between the combined dot pattern 1403 and the forward-backward misalignment dot pattern 1404, both patterns are substantially the same type of pattern and the coverage area of the dots relative to the print medium is also substantially the same. Since the dot diameter of each dot is 50 μm, a proportion of the coverage area of dots (hereinafter, referred to as dot coverage area) to the print medium is 78% in both patterns. Specifically, in this embodiment in which the first dot pattern 1401 is printed in the forward scan and the second dot pattern 1402 is printed in the backward scan, even if the print positions in the forward scan and the backward scan are misaligned by about one pixel, no great change appears in the image and an uniform image can be printed.

Description is given below of a system in which the coverage in the combined dot pattern 1403 and the coverage in the forward-backward misalignment dot pattern 1404 become substantially the same.

First, in the first dot pattern 1401 and the second dot pattern 1402, the distance between the centers of the two dots forming the dot pair in the X direction is referred to as A1 and the cycle at which the dot pairs are arranged in the X direction is referred to as B1. Moreover, in the first raster of the combined dot pattern, a distance between the dot pair in the first dot pattern and the dot pair in the second dot pattern in the X direction is referred to as D. In the example of FIG. 14, A1=2, B1=8, and D≈6 (D=5 on the image data) in terms of the number of pixels in 600 dpi. Moreover, the shift amount of the dot pair in the second raster relative to the dot pair in the first raster in the X direction in the first dot pattern 1401 is referred to as C1. Furthermore, the shift amount of the dot pair in the second raster relative to the dot pair in the first raster in the X direction in the second dot pattern 1402 is referred to as −C1.

In this case, the distance (hereinafter, referred to as dot pair distance) between the center of the dot pair in the first dot pattern and the center of the dot pair in the second dot pattern in the second raster of the combined dot pattern 1403 is (D−2C1). Moreover, a superimposed region defined by such dot pairs appears at the cycle B1 in the X direction. Furthermore, the aforementioned pair dot distance is (D−4C1) in the third raster and the dot pair distance in an N-th raster can be expressed as (D−2C1×(N−1)).

As described above, the aforementioned dot pair distance, that is the dot arrangement in the raster varies among the rasters in the combined dot pattern 1403. In this example, the dot arrangement in the raster returns to the same arrangement as that in the first raster at N=129. Specifically, the dot arrangements expressed by the first to one hundred twenty eighth rasters are repeated in the Y direction.

Assume the case where the second dot pattern is misaligned relative to the first dot pattern in the +X direction by one pixel (42 μm) in 600 dpi. In this case, the dot arrangement in the first raster of the combined dot pattern 1403 is reproduced in an N-th raster in which the value of 2C1× (N−1) is the closest to 42 μm. As a result, a dot pattern with the same contents as those in the combined dot pattern 1403 is formed from the N-th raster with 128 rasters being one cycle. In other words, since an N-th raster in which the value of 2C1×(N−1) is the closest to a misalignment amount is present regardless of the degree of misalignment in the X direction, a similar pattern with a different phase is formed. That is the system in which the coverage in the combined dot pattern 1403 and the coverage in the forward-backward misalignment dot pattern 1404 become substantially the same. Specifically, at grayscale values expressed by the first dot pattern 1401 and the second dot pattern 1402 as illustrated in FIG. 14, it is possible to stabilize the dot coverage on the print medium and print an image without density unevenness even if print misalignment occurs for some reason.

In the embodiment, 2C1×(N−1) is about 42 μm at N=25. Accordingly, the forward-backward misalignment dot pattern 1404 of FIG. 14 is a pattern shifted relative to the combined dot pattern 1403 by 25 pixels in the Y direction.

In the embodiment, description is given of the example of the first dot pattern 1401 and the second dot pattern 1402 that have an inverted relationship in the X direction. Specifically, description is given of the case where the number (two) of dots forming the dot group, the distance A1, and the cycle B at which the dot groups are arranged are the same between the first dot pattern 1401 and the second dot pattern 1402. Moreover, description is given of the case where the offset amount of the offset between the rasters adjacent each other in the Y direction is the same and the offset direction of this offset is the opposite between the first dot pattern 1401 and the second dot pattern 1402. However, the effects of the embodiment are obtained not only in such conditions. The aforementioned effect of keeping the dot coverage on the print medium within a certain range can be obtained as long as at least one of the shift amount and the shift direction varies between the rasters adjacent to each other in the Y direction in the first dot pattern 1401 and the second dot pattern 1402. Conditions for obtaining the effects of the embodiment are described below.

First, in the first dot pattern, in the case where N1 (N1≥2) dots arranged away from each other by A1 pixels in the X direction is referred to as first dot group, a relationship between the n-th raster and the (n+1)th raster adjacent to each other in the Y direction only needs to satisfy the following conditions.
(i) In the dot arrangement of the n-th raster, the first dot groups are arranged at a cycle of B1 pixels, where B1≥A1× N1.
(ii) In the dot arrangement of the (n+1)th raster, the first dot groups are arranged at the cycle of B1 pixels while being shifted relative to the dot arrangement in the n-th raster by C1 pixels in the X direction, where A1×(N1−1)<C1<B1− A1×(N1−1).

Moreover, in the second dot pattern, in the case where N2 (N2≥2) dots arranged away from each other by A2 pixels in the X direction is referred to as second dot group, a relationship between the m-th raster and the (m+1)th raster adjacent to each other in the Y direction only needs to satisfy the following conditions.
(iii) In the dot arrangement of the m-th raster, the second dot groups are arranged at a cycle of B2 pixels, where B2≥A2× N2.
(iv) In the dot arrangement of the (m+1)th raster, the second dot groups are arranged at the cycle of B2 pixels while being shifted relative to the dot arrangement in the m-th raster by C2 pixels in the X direction, where A2×(N2−1)<C2<B2− A2×(N2−1).
(v) C1 and C2 are different values.

The effects described above can be obtained as long as the aforementioned conditions (i) to (v) are satisfied. Note that, in the embodiment, description is given the case where the first dot group in the first dot pattern and the second dot group in the second dot pattern are the same, specifically the case where A1=A2 and N1=N2, as more preferable conditions under the aforementioned conditions. Moreover, description is given of the case where these dot groups are arranged at the same cycle, specifically the case where B1=B2. Furthermore, description is given of the case where the shift amount of the dot arrangements in the adjacent rasters is the same but the shift direction is different between the first dot pattern and the second dot pattern, specifically, the case where C1=−C2.

Moreover, in the embodiment, the configuration is such that a dot for one pixel in 600 dpi can be printed only by one of the LEv row or the LOd row. Accordingly, the first and second dot groups in the adjacent two rasters preferably do not overlap each other in the X direction. Thus, it is preferable that the cycles B1 and B2 satisfy B1≥A1×N1×2 and B2≥A2×N2×2.

Next, dot patterns in the case where print positions of the LEv row and the LOd row are misaligned are discussed. The LEv row and the LOd row configured to eject the cyan ink are arranged at an interval in the X direction as described in FIGS. 2A to 2C and the control of shifting the drive timings as illustrated in FIGS. 9A and 9B are performed. Accordingly, misalignment sometimes occurs between the dot print position of the LEv row and the dot print position of the LOd row due to variation in the distance between the nozzle surface and the print medium caused by cockling or the like, the variation in carriage speed, and the like.

Figure 15:
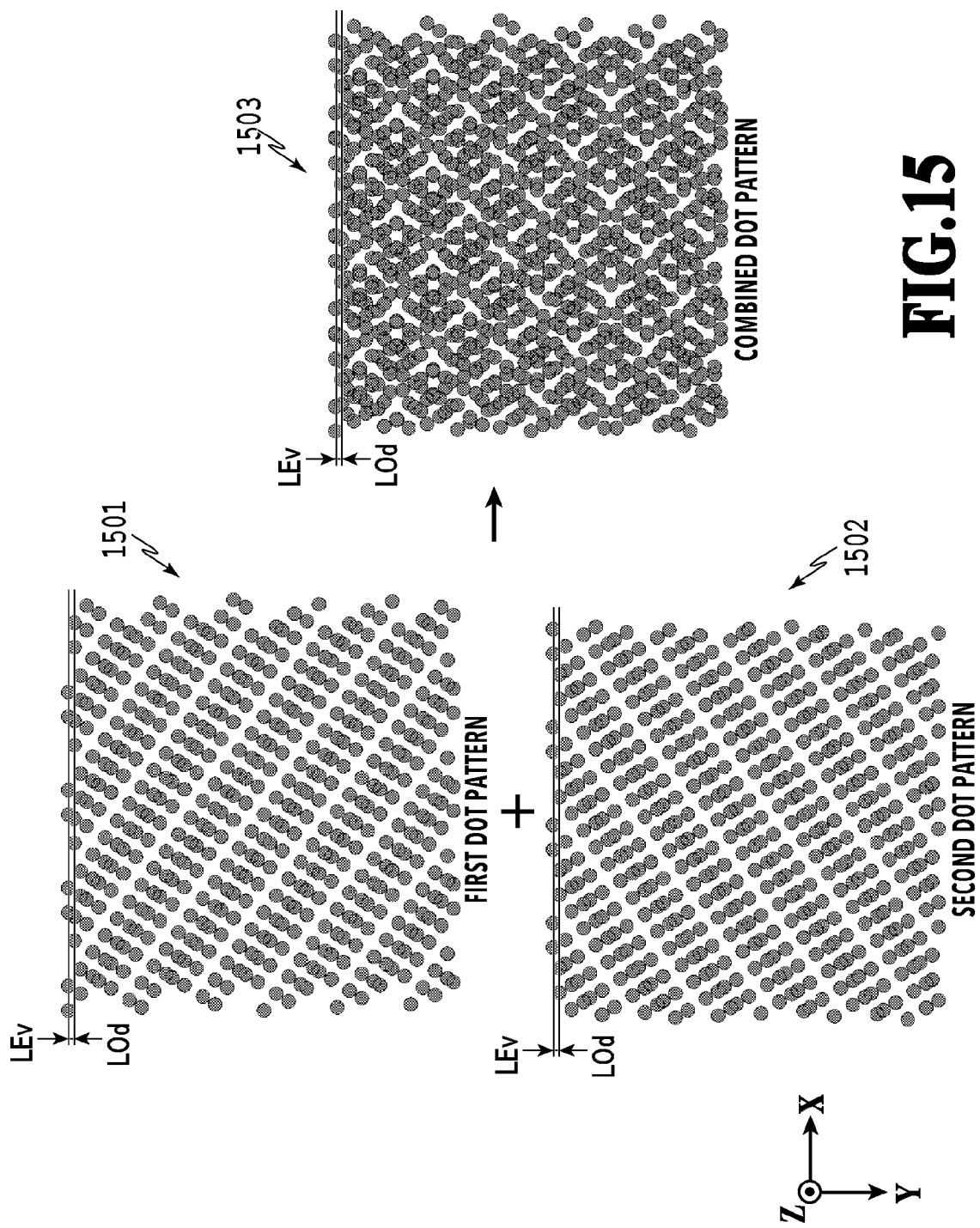
FIG. 15 is a diagram illustrating dot patterns in the case where misalignment occurs between the LEv row and the LOd row.

FIG. 15 is a diagram illustrating a first dot pattern 1501, a second dot pattern 1502, and a combined dot pattern 1503 in the case where the dot print position of the LOd row is misaligned relative to the dot print position of the LEv row in the +X direction by one pixel (about 42 μm) in 600 dpi.

In comparison of the first dot pattern 1501 to the first dot pattern 1401 of FIG. 14, it is found that superimposed regions are formed between the dots of the LEv row and the dots of the LOd row. However, if we look into each of the dot pairs in each raster, one dot is superimposed on a dot in the adjacent raster but the other dot does not due to the shifting between the LEv row and the LOd row. Moreover, since these dots in the dot pair are arranged at an interval of two pixels in 600 dpi in the X direction, the aforementioned relationship of the superimposed dot and the not-superimposed dot is maintained even if the print position of the LOd row is further misaligned by one pixel in the +X direction. Although the example of misalignment in the +X direction is described herein, the same applies to misalignment in the −X direction except for the point that the relationship of the superimposed dot and the not-superimposed dot in the dot pair is reversed.

The same applies to the case where the second dot pattern 1502 of FIG. 15 is compared with the second dot pattern 1402 of FIG. 14. Moreover, in FIG. 15, the first dot pattern 1501 and the second dot pattern 1502 have an inverted relationship in the X direction. Assuming that the dot diameter of each dot is 50 μm under the aforementioned conditions, the dot coverage relative to the print medium is 73% in the combined dot pattern 1503. Although this coverage is about 5% lower than the coverage 78% of the combined dot pattern 1403 illustrated in FIG. 14, a change in the coverage of this level is not visually noticeable.

Figure 16:
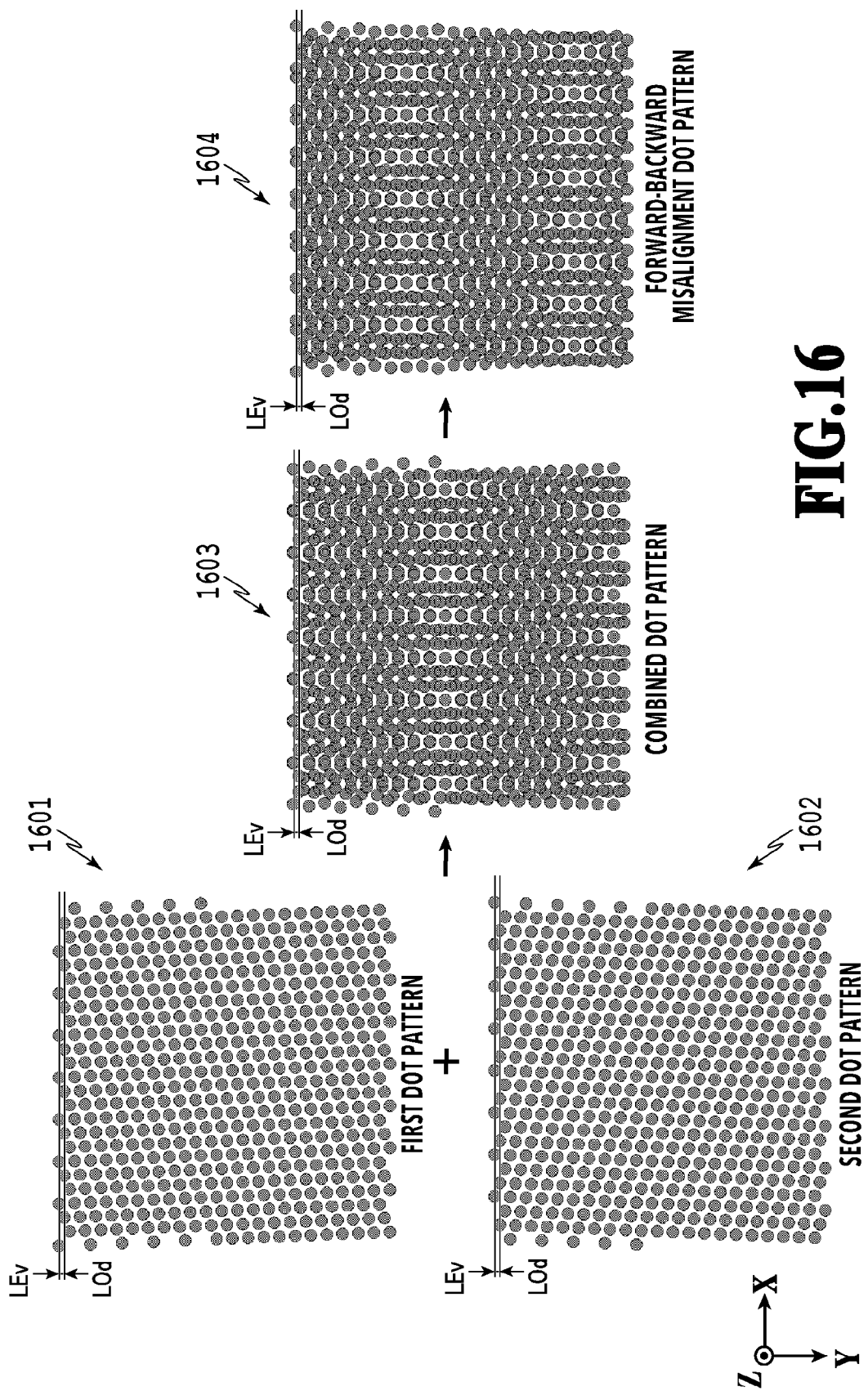
FIG. 16 is a diagram illustrating a comparative example.

FIG. 16 is a diagram for explaining conventional dot patterns generated according to a quantization process with high dispersiveness as a comparative example. A first dot pattern 1601 illustrates a dot pattern printed in the forward scan and a second dot pattern 1602 illustrates a dot pattern printed in the backward scan. Moreover, a combined dot pattern 1603 illustrates a dot pattern obtained by combining the first dot pattern 1601 and the second dot pattern 1602 without misalignment. Furthermore, a dot pattern 1604 illustrates a state where the second dot pattern 1602 is misaligned relative to the first dot pattern 1601 in the +X direction by one pixel (≈42 μm) in 600 dpi. In all dot patterns, the dots printed by the LEv row and the dots printed by the LOd row are alternately arranged in the Y direction.

In both of the first dot pattern 1601 and the second dot pattern 1602, all dots are evenly scattered and no characteristic dot groups such as dot pairs described in FIG. 14 are present. Moreover, in the comparative example as described above, the dot coverage is 78% in both of the combined dot pattern 1603 and the forward-backward misalignment dot pattern 1604. Specifically, in the case where print positions of the forward scan and the backward scan are misaligned, no great change in the image density occurs also in the comparative example.

Figure 17:
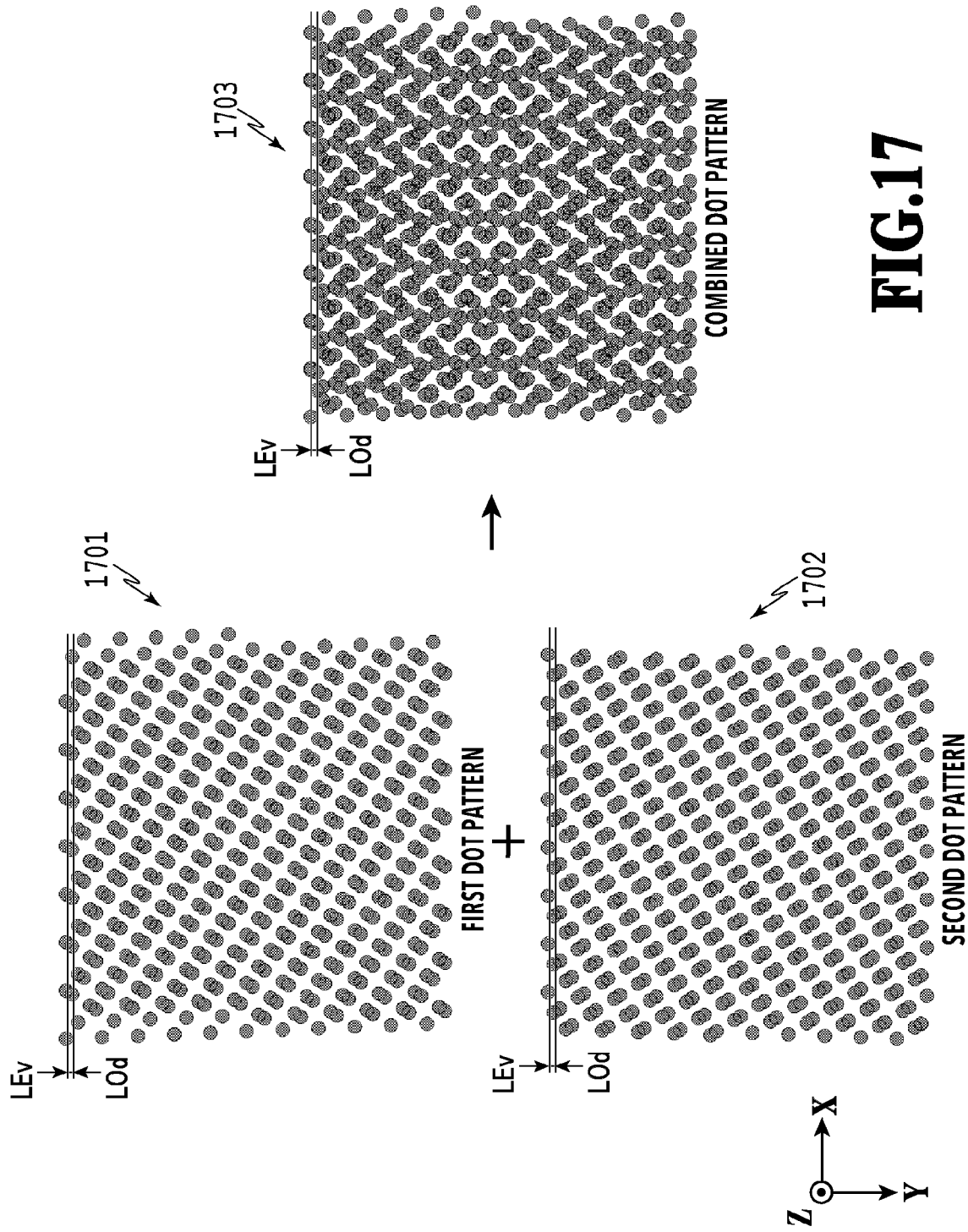
FIG. 17 is a diagram illustrating the comparative example.

Meanwhile, FIG. 17 is a diagram for explaining dot patterns in the case where dot print misalignment occurs between the LEv row and the LOd row in the aforementioned comparative example. FIG. 17 illustrates a first dot pattern 1701, a second dot pattern 1702, and a combined dot pattern 1703 in the case where the dot print position of the LOd row is misaligned relative to the dot print position of the LEv row in the +X direction by one pixel (≈42 µm) in 600 dpi.

In the comparative example, almost all of the dots form superimposed dots in the first dot pattern 1701 and the second dot pattern 1702. As a result, in the combined dot pattern 1703, a white region increases from that in the combined dot pattern 1603 illustrated in FIG. 16 in which there is no misalignment, and the coverage area also greatly decreases from that in the combined dot pattern 1603. Assuming that the dot diameter of each dot is 50 µm, the dot coverage is 68% and has dropped 10% from the coverage 78% of the combined dot pattern 1603. As a result, such a change in the coverage of about 10% is visually recognized. Specifically, in the case where the comparative example is employed, density unevenness due to print misalignment between the forward and backward scans is unnoticeable but density unevenness is noticeable in the case where dot print positions of the LEv row and the LOd row are misaligned.

Meanwhile, in the embodiment, the coverage on the print medium can be kept within a certain range in the case where the print positions are misaligned between the forward and backward scans (see FIG. 14) and in the case where the dot print positions are misaligned between the nozzle rows of the LEv row and the LOd row (see FIG. 15). Specifically, the dot patterns of the embodiment can suppress density unevenness and enable stable printing of a high-quality image with excellent uniformity.

Note that, although the case where the gray scale data is C1'=C2'=128 is described in FIGS. 13A to 15, in the embodiment, the aforementioned effects can be obtained also in the case where other pieces of grayscale data are inputted as a matter of course.

Figure 18A:
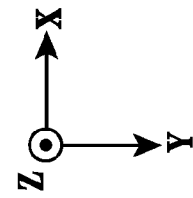
FIGS. 18A and 18B are diagrams illustrating results of the quantization process.
Figure 18B:
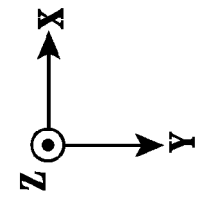

FIGS. 18A and 18B are diagrams illustrating results of the quantization process in steps S505-1 and S505-2 in the case where grayscale data of C1'=C2'=255 is uniformly inputted for all of 32 pixels×32 pixels. In the case where C1'=C2'=255, the quantization values of all pixels in the first threshold matrix 1001 and the second threshold matrix 1002 are print (C1"=1, C2"=1) and are illustrated by black pixels in FIGS. 18A and 18B.

Figure 19:
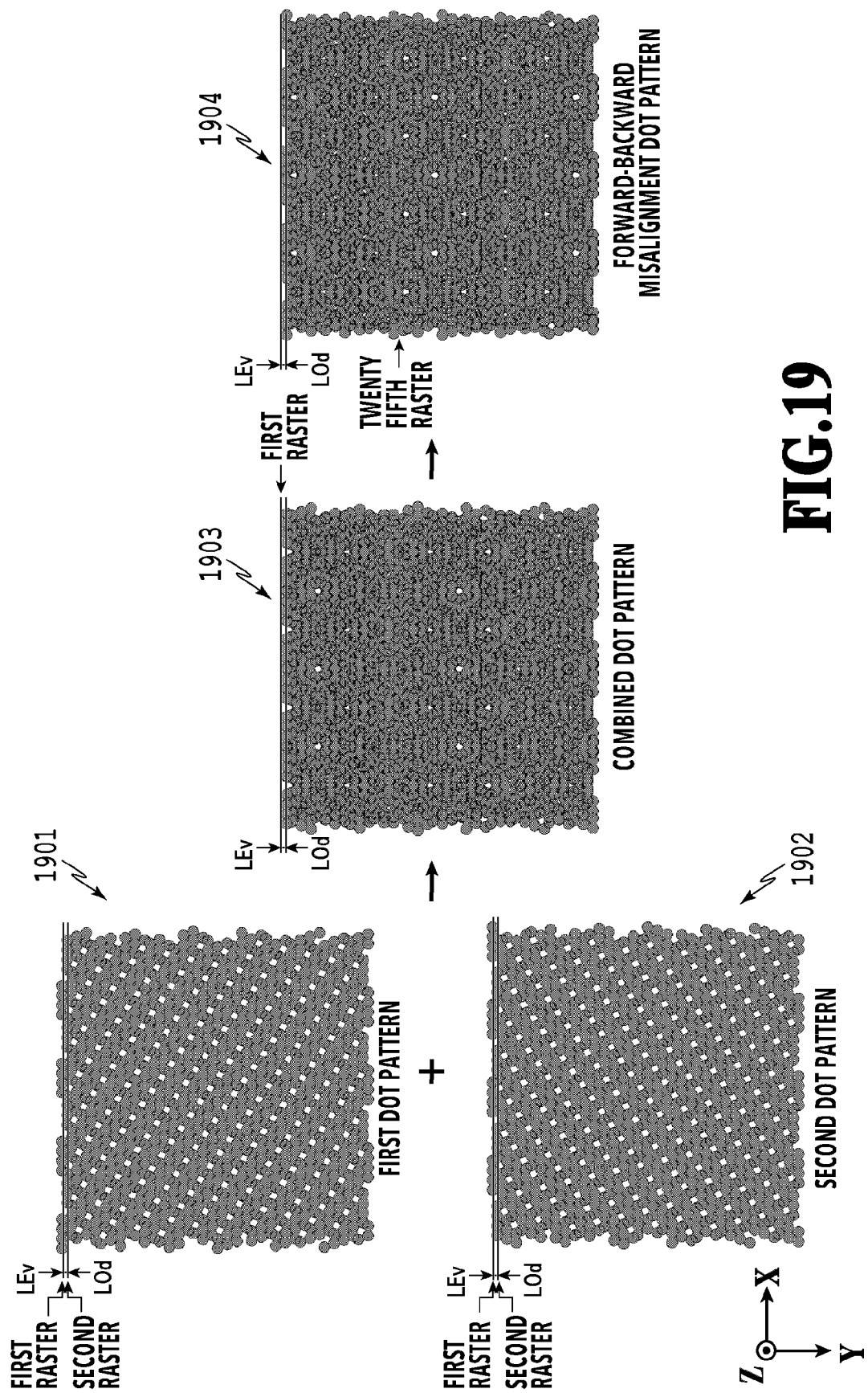
FIG. 19 is a diagram illustrating dot patterns in the case where forward-backward misalignment occurs.

FIG. 19 is a diagram illustrating dot patterns formed on the print medium in the case where the ejection operation is performed while performing the time divisional driving described in FIG. 4 according to the index patterns described in FIGS. 11, 12A, and 12B based on the quantized data illustrated in FIGS. 18A and 18B, as in FIG. 14.

If we view the first raster of a first dot pattern 1901 in FIG. 19 in the +X direction, an arrangement in which four dots printed by the LEv row are disposed side by side and then four dots are disposed side by side again at an interval is repeated four times. Moreover, if we view the second raster in the +X direction, an arrangement in which four dots printed by the LOd row are disposed side by side and then four dots are disposed side by side again at an interval is repeated four times. A dot interval of the four dots disposed side by side (hereinafter, referred to as four-dot group) and a cycle at which the four-dot groups are arranged in the X direction are the same between the first raster and the second raster and the same applies to the third raster and beyond. In addition, the positions of the four-dot groups in the X direction are shifted by a certain amount in the +X direction as the raster number increases.

Meanwhile, a second dot pattern 1902 is a pattern obtained by inverting the first dot pattern 1901 in the X direction. Specifically, the four-dot groups similar to those in the first dot pattern 1901 are arranged at the same cycle as that in the first dot pattern 1901 in each raster and, in this state, the positions of the four-dot groups in the X direction are shifted by the aforementioned certain amount in the −X direction as the raster number increases.

In comparison between a combined dot pattern 1903 and a forward-backward misalignment dot pattern 1904, both patterns follow the system described above and are the same type of pattern with different phases. Accordingly, both patterns have the same dot coverage area relative to the print medium and have the coverage of 99%. Specifically, in this embodiment in which the first dot pattern 1901 is printed in the forward scan and the second dot pattern 1902 is printed in the backward scan, even if the print positions in the forward scan and the backward scan are misaligned by about one pixel, no great change appears in the image and an uniform image can be printed.

Figure 20:
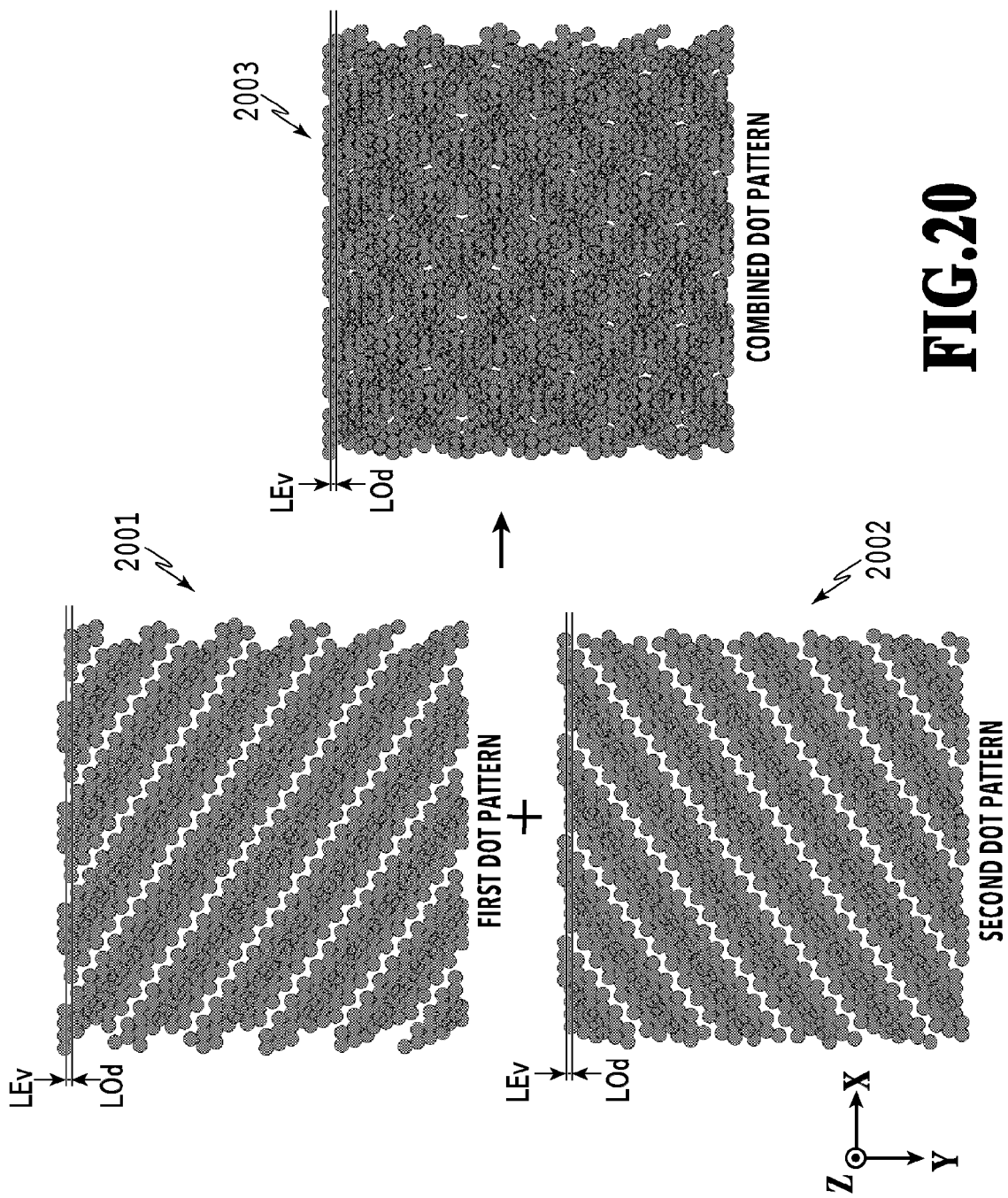
FIG. 20 is a diagram illustrating dot patterns in the case where misalignment occurs between the LEv row and the LOd row.

FIG. 20 is a diagram illustrating dot patterns in the case where the grayscale data is C1'=C2'=255 and the dot print position of the LOd row is misaligned relative to the dot print position of the LEv row in the +X direction by one pixel (about 42 µm) in 600 dpi, in comparison to the FIG. 19. In comparison to the dot patterns 1901 and 1902 without misalignment, a first dot pattern 2001 and a second dot pattern 2002 both have portions where separated dots are superimposed one on top of the other and portions where superimposed dots are separated from each other. To be more specific, in the rasters printed by LEv, the superimposed region of the leftmost dot in each four-dot group increases but the superimposed region of the rightmost dot decreases. Moreover, in the rasters printed by LOd, the superimposed region of the rightmost dot in each four-dot group increases but the superimposed region of the leftmost dot decreases. Since the superimposing and the separation of the dots occur at the same frequency in the entire regions of the patterns as described above, the overall coverage is maintained at the same level. As a result, dot coverage (about 99%) similar to that of the combined dot pattern 1903 without print misalignment between the LEv row and the LOd row can be obtained also in a combined dot pattern 2003.

Specifically, according to the embodiment, the dot coverage on the print medium can be maintained at a constant level even if the print misalignment of about one pixel occurs between the LEv row and the LOd row in an image in which the grayscale data is C1'=C2'=255. Particularly, in a high grayscale range as in this example, positively forming a specific dot arrangement such as four-dot groups can further improve an effect of keeping the dot coverage at a certain level, from that in the case of using the dot pairs described in FIG. 14.

Figure 21A:
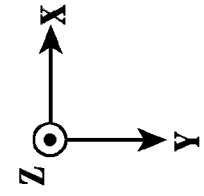
FIGS. 21A and 21B are diagrams illustrating results of the quantization process.
Figure 21B:
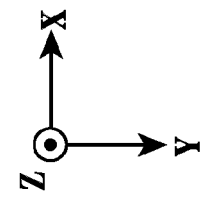

FIGS. 21A and 21B are diagrams illustrating results of the quantization process of steps S505-1 and S505-2 in the case where grayscale data of C1'=C2'=64 is uniformly inputted for all of 32 pixels×32 pixels. In each of the first threshold matrix 1001 and the second threshold matrix 1002, the pixels illustrated in black correspond to pixels for which the quantized values are set to print (C1"=1, C2"=1). Since the first threshold matrix 1001 and the second threshold matrix 1002 are in a symmetric relationship in the X direction, the arrangement of black pixels illustrated in FIG. 21A and the arrangement of black pixels illustrated in FIG. 21B are in a symmetric relationship in the X direction.

Figure 22:
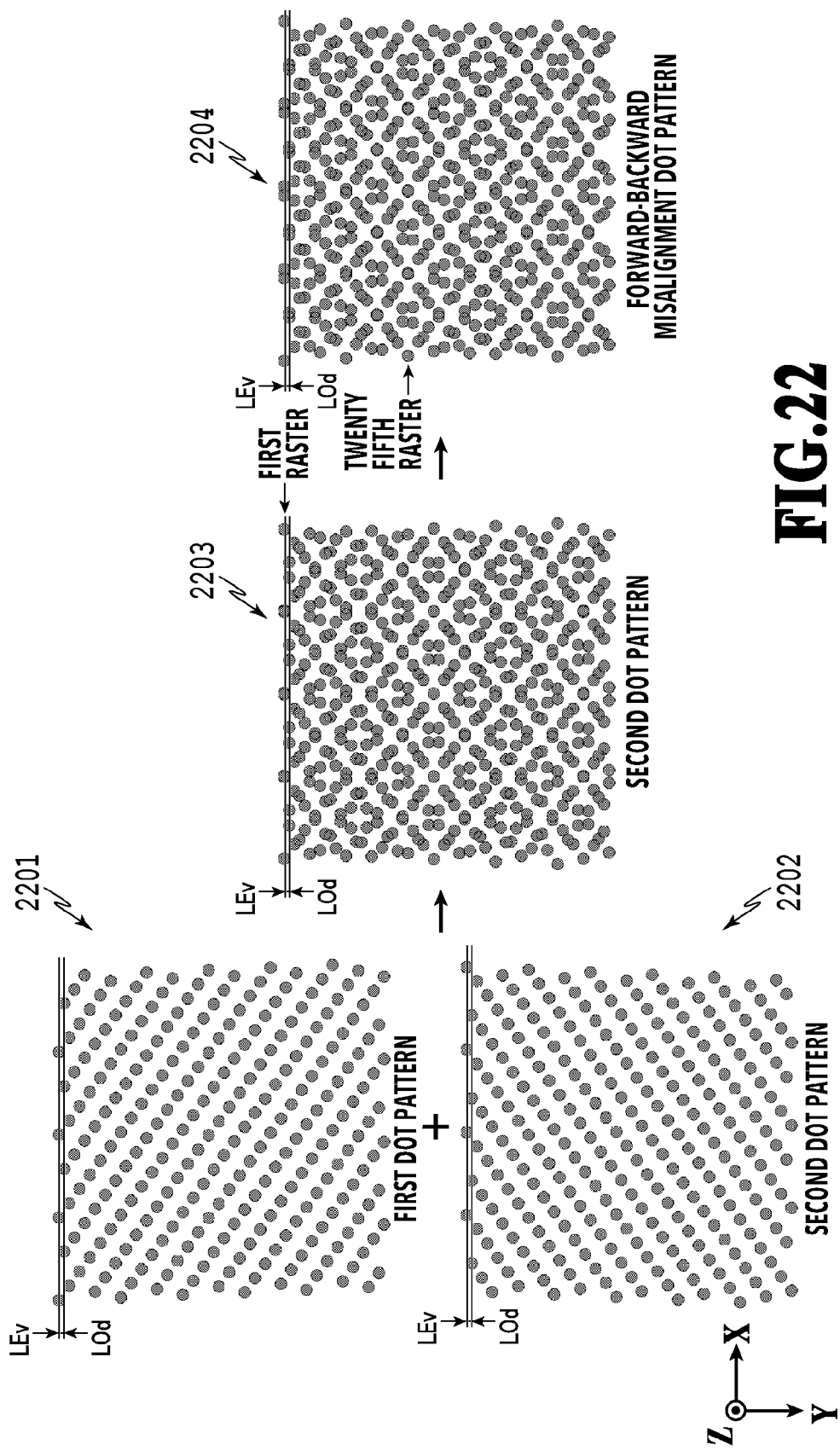
FIG. 22 is a diagram illustrating dot patterns in the case where forward-backward misalignment occurs.

FIG. 22 is a diagram illustrating dot patterns formed on the print medium in the case where the ejection operation is performed while performing the time divisional driving described in FIG. 4 according to the index patterns described in FIGS. 11, 12A, and 12B based on the quantized data illustrated in FIGS. 21A and 21B, as in FIG. 14.

If we view the first raster of a first dot pattern 2201 in the +X direction, an arrangement in which one dot printed by the LEv row is present and then one dot is present again at an interval is repeated four times. Moreover, if we view the second raster in the +X direction, an arrangement in which one dot printed by the LOd row is present and then one dots is present again at an interval is repeated four times. A cycle at which the dots are arranged in the X direction is the same between the first raster and the second raster and the same applies to the third raster and beyond. In addition, the positions where the dots are present in the X direction are shifted by a certain amount in the +X direction as the raster number increases.

Meanwhile, a second dot pattern 2202 is a pattern obtained by inverting the first dot pattern 2201 in the X direction. Specifically, the dots are arranged at the same cycle as that in the first dot pattern 2201 in each raster and, in this state, the positions of the dots in the X direction are shifted by the aforementioned certain amount in the -X direction as the raster number increases.

As described above, in the first and second dot patterns 2201 and 2202 corresponding to the case where the grayscale value is low, no portion where the dots are sparse or dense as found in the first and second dot patterns of FIG. 14 or FIG. 19 is found and individual dots are arranged with high dispersiveness.

In comparison between a combined dot pattern 2203 and a forward-backward misalignment dot pattern 2204, both patterns are the same type of pattern with different phases. Accordingly, both patterns have the same dot coverage area relative to the print medium and have the coverage of 46%. Specifically, in this embodiment in which the first dot pattern 2201 is printed in the forward scan and the second dot pattern 2202 is printed in the backward scan, even if the print positions in the forward scan and the backward scan are misaligned by about one pixel, no great change appears in the image and an uniform image can be printed.

Figure 23:
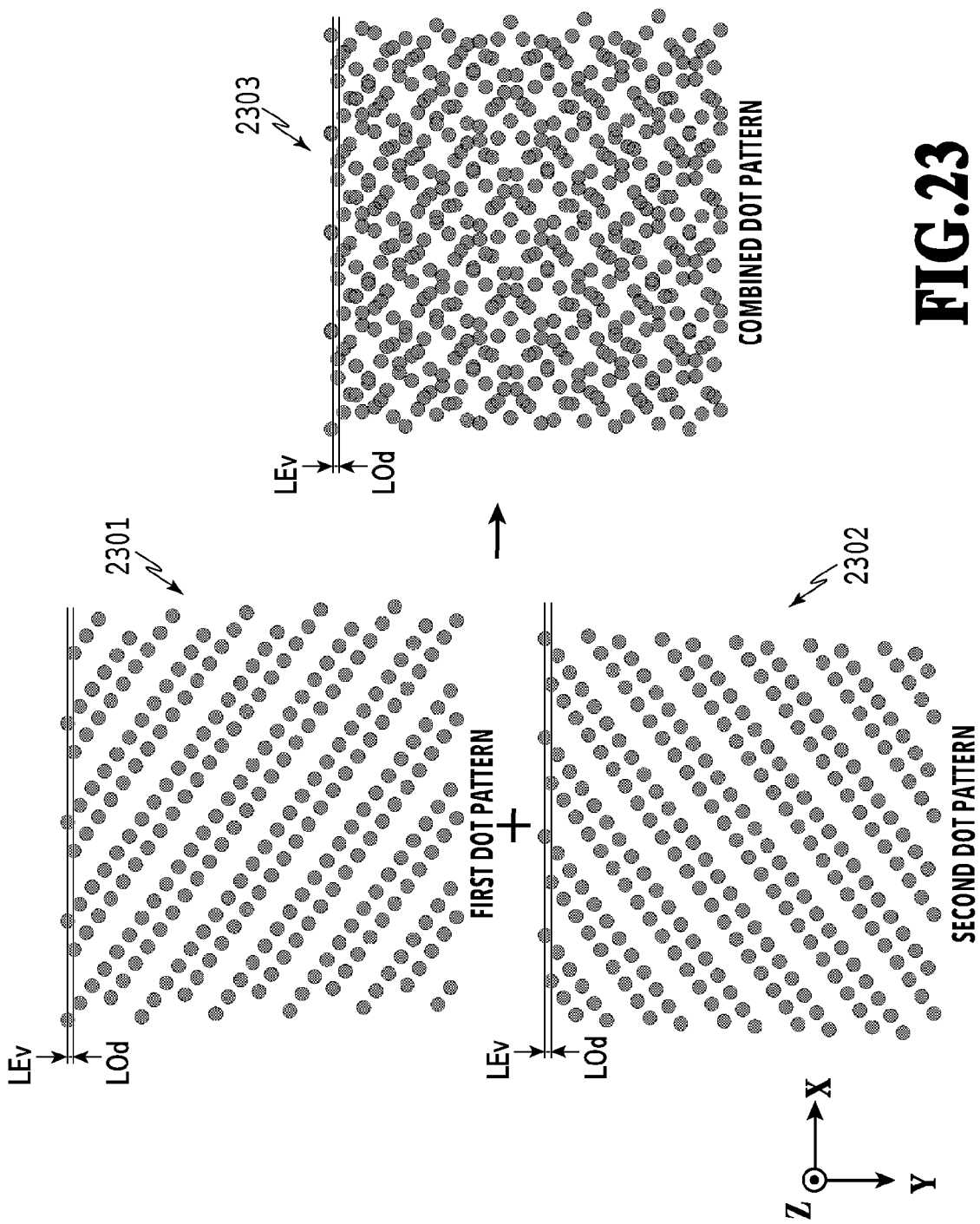
FIG. 23 is a diagram illustrating dot patterns in the case where misalignment occurs between the LEv row and the LOd row.

FIG. 23 is a diagram illustrating dot patterns in the case where the grayscale data is C1'=C2'=64 and the dot print position of the LOd row is misaligned relative to the dot print position of the LEv row in the +X direction by one pixel (about 42 μm) in 600 dpi, in comparison to the FIG. 22. Although the levels of concentration of dots in a first dot pattern 2301 and a second dot pattern 2302 changes from those in the dot patterns 2201 and 2202 without misalignment illustrated in FIG. 22, the first and second dot patterns 2301 and 2302 have no portion where separated dots are superimposed one on top of the other.

Assuming that the dot diameter of each dot is 50 μm, the dot coverage is about 46% in a combined dot pattern 2303 obtained by combining the first dot pattern 2301 and the second dot pattern 2302 described above. This is the same as the coverage of the combined dot pattern 2203 without print misalignment illustrated in FIG. 22.

Specifically, even if print misalignment of about one pixel occurs between the LEv row and the LOd row in an image in which the grayscale data is C1'=C2'=64, the dot coverage on the print medium is maintained at a constant level and no density unevenness is confirmed. Particularly, in the case where misalignment occurs between the LEv row and the LOd row as in FIG. 23, in a grayscale region where no superimposed dots appear, the dot coverage can be maintained at a constant level even if a predetermined dot arrangement such as the dot pairs or the four-dot groups as described above are not formed.

The aforementioned first dot patterns 1401, 1901, and 2201 in the embodiment are patterns achieved by cooperation of the first threshold matrix 1001 of FIG. 10A, the first index pattern 1101 of FIG. 11, and the time divisional driving in the forward scan. Moreover, the second dot patterns 1402, 1902, and 2202 are patterns achieved by cooperation of the second threshold matrix 1002 of FIG. 10B, the second index pattern 1102 of FIG. 11, and the time divisional driving in the backward scan. In other words, in the embodiment, threshold matrices and index patterns that enable obtaining of the first dot pattern 1401 and the second dot pattern 1402 in FIG. 14 are prepared based on dot landing characteristics in the case where the time divisional driving is employed in bidirectional multipass printing. Performing the image processing according to FIG. 5 while using these matrices and patterns enables printing of the preferable first dot pattern and second dot pattern that have resistance to print misalignment between the forward and backward scans and print misalignment between the LEv row and the LOd row, at each grayscale level.

OTHER EMBODIMENTS

Although the contents in which the image processing apparatus 1 performs the steps described in FIG. 5 are described above, the controller 301 of the printing apparatus 2 may perform some of the steps. In the steps illustrated in the aforementioned flowcharts, there is no particular definition of a clear border between the steps performed by the image processing apparatus 1 and the steps performed by the printing apparatus 2. For example, the configuration may be such that the image processing apparatus 1 performs the steps up to the quantization process and the printing apparatus 2 performs the index development process and beyond. In any case, the entire print system including the image processing apparatus 1 and the printing apparatus 2 is the printing apparatus of the present invention.

Moreover, the number of bits of input-output data in each step is not limited to the number of bits described above. The number of bits of output data may be set higher than the number of bits of input data to maintain accuracy. Moreover, although four colors of CMYK are described as an example of the number of colors in the printing apparatus, the printing apparatus may be configured to use colors that are of the same type but have different densities such as light cyan, light magenta, and gray and particular colors such as red, green, and blue. In this case, the image processing apparatus only has to generate as many types of grayscale data as the number of colors in the color separation process and perform the aforementioned image processes for each color in the processes after the color separation process.

Moreover, although the thermal jet print head that ejects the ink by applying the voltage pulse to the heater is used in the aforementioned embodiments, the applying method of color material is not limited to a particular method in any of the aforementioned embodiments. For example, the embodiments can be effectively applied to various printing apparatuses such as a so-called piezoelectric inkjet recording apparatus that applies ink by using a piezoelectric element.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-128323, filed Jul. 29, 2020, which is hereby incorporated by reference wherein in its entirety.

What is claimed is:

1. A printing method comprising:
a step of forming a first dot pattern in a predetermined region on a print medium by causing a printing unit to perform a forward scan in a main scanning direction intersecting a predetermined direction, the printing unit including a first print element row in which print elements configured to apply printing material are aligned at a predetermined resolution in the predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution; and
a step of forming a second dot pattern in the predetermined region by causing the printing unit to perform a backward scan in the opposite direction to that of the forward scan, wherein
in the first dot pattern
in a first dot array that is any dot array printed by print elements of one of the first print element row and the second print element row to be aligned in the main scanning direction, first dot groups, each formed of $N1$ ($N1 \geq 2$) dots arranged $A1$ pixels away from each other in the main scanning direction, are arranged at an interval of $B1$ pixels ($B1 \geq A1 \times N1$), and
in a second dot array that is a dot array adjacent to the first dot array in the predetermined direction and printed by the print elements of the other one of the first print element row and the second print element row to be aligned in the main scanning direction, the first dot groups are arranged at an interval of $B1$ pixels while being shifted relative to the first dot array by $C1$ pixels ($A1 \times (N1-1) < C1 < B1 - A1 \times (N1-1)$) in the main scanning direction, in the second dot pattern
in a third dot array that is any dot array printed by the print elements of one of the first print element row and the second print element row to be aligned in the main scanning direction, second dot groups, each formed of $N2$ ($N2 \geq 2$) dots arranged $A2$ pixels away from each other in the main scanning direction, are arranged at an interval of $B2$ pixels ($B2 \geq A2 \times N2$), and
in a fourth dot array that is a dot array adjacent to the third dot array in the predetermined direction and printed by the print elements of the other one of the first print element row and the second print element row to be aligned in the main scanning direction, the second dot groups are arranged at an interval of $B2$ pixels while being shifted relative to the third dot array by $C2$ pixels ($A2 \times (N2-1) < C2 < B2 - A2 \times (N2-1)$) in the main scanning direction, and
$C1$ and $C2$ are different from each other.

2. The printing method according to claim 1, wherein $B1 \geq A1 \times N1 \times 2$ and $B2 \geq A2 \times N2 \times 2$.

3. The printing method according to claim 1, wherein $N1 = N2$.

4. The printing method according to claim 1, wherein $A1 = A2$.

5. The printing method according to claim 1, wherein $B1 = B2$.

6. The printing method according to claim 1, wherein $C1 = -C2$.

7. The printing method according to claim 1, wherein the number $N1$ of dots forming each of the first dot groups and the number $N2$ of dots forming each of the second dot groups in the case where a predetermined grayscale value expressed by the first dot pattern and the second dot pattern in the predetermined region is a first grayscale value are greater than the number $N1$ of dots forming each of the first dot groups and the number $N2$ of dots forming each of the second dot groups in the case where the predetermined grayscale value is a second grayscale value lower than the first grayscale value, respectively.

8. The printing method according to claim 1, comprising:
a step of dividing grayscale data, corresponding to a predetermined grayscale value expressed by the first dot pattern and the second dot pattern in the predetermined region, into first grayscale data and second grayscale data;
a quantization step of quantizing the first grayscale data by using a first threshold matrix to generate first quantized data and quantizing the second grayscale data by using a second threshold matrix different from the first threshold matrix to generate second quantized data; and
a converting step of converting the first quantized data into first print data printable by the first print element row and the second print element row by using a first index pattern used to set print or non-print of a dot for each of pixels aligned at a resolution twice a resolution of the grayscale data in the predetermined direction and converting the second quantized data into second print data printable by the first print element row and the second print element row by using a second index pattern different from the first index pattern, wherein
the printing unit prints the first dot pattern according to the first print data and prints the second dot pattern according to the second print data.

9. The printing method according to claim 8, wherein the print elements included in the first print element row and the print elements included in the second print element row are driven at different timings according to a predetermined order for print data of the same pixel position in the main scanning direction in each of the forward scan and the backward scan.

10. A non-transitory computer-readable storage medium storing a program for causing one or more processors of a computer to execute an information processing method, the information processing method comprising:

a step of forming a first dot pattern in a predetermined region on a print medium by causing a printing unit to perform a forward scan in a main scanning direction intersecting a predetermined direction, the printing unit including a first print element row in which print elements configured to apply printing material are aligned at a predetermined resolution in the predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution; and a step of forming a second dot pattern in the predetermined region by causing the printing unit to perform a backward scan in the opposite direction to that of the forward scan, wherein in the first dot pattern in a first dot array that is any dot array printed by print elements of one of the first print element row and the second print element row to be aligned in the main scanning direction, first dot groups, each formed of N1 (N1≥2) dots arranged A1 pixels away from each other in the main scanning direction, are arranged at an interval of B1 pixels (B1≥A1×N1), and in a second dot array that is a dot array adjacent to the first dot array in the predetermined direction and printed by the print elements of the other one of the first print element row and the second print element row to be aligned in the main scanning direction, the first dot groups are arranged at an interval of B1 pixels while being shifted relative to the first dot array by C1 pixels (A1×(N1−1)<C1<B1−A1×(N1−1)) in the main scanning direction, in the second dot pattern in a third dot array that is any dot array printed by the print elements of one of the first print element row and the second print element row to be aligned in the main scanning direction, second dot groups, each formed of N2 (N2≥2) dots arranged A2 pixels away from each other in the main scanning direction, are arranged at an interval of B2 pixels (B2≥A2×N2), and in a fourth dot array that is a dot array adjacent to the third dot array in the predetermined direction and printed by the print elements of the other one of the first print element row and the second print element row to be aligned in the main scanning direction, the second dot groups are arranged at an interval of B2 pixels while being shifted relative to the third dot array by C2 pixels (A2×(N2−1)<C2<B2−A2×(N2−1)) in the main scanning direction, and C1 and C2 are different from each other.

11. A printing apparatus configured to print an image of a predetermined grayscale value on a print medium, comprising:

a printing unit including a first print element row in which print elements configured to apply printing material are aligned at a predetermined resolution in a predetermined direction and a second print element row in which print elements configured to apply printing material are aligned at the predetermined resolution in the predetermined direction and are arranged while being shifted relative to the first print element row in the predetermined direction by a distance corresponding to a resolution twice the predetermined resolution;

a first forming unit configured to form a first dot pattern in a predetermined region on the print medium by causing the printing unit to perform a forward scan in a main scanning direction intersecting the predetermined direction; and a second forming unit configured to form a second dot pattern in the predetermined region by causing the printing unit to perform a backward scan in the opposite direction to that of the forward scan, wherein in the first dot pattern in a first dot array that is any dot array printed by print elements of one of the first print element row and the second print element row to be aligned in the main scanning direction, first dot groups, each formed of N1 (N1≥2) dots arranged A1 pixels away from each other in the main scanning direction, are arranged at an interval of B1 pixels (B1≥A1×N1), and in a second dot array that is a dot array adjacent to the first dot array in the predetermined direction and printed by the print elements of the other one of the first print element row and the second print element row to be aligned in the main scanning direction, the first dot groups are arranged at an interval of B1 pixels while being shifted relative to the first dot array by C1 pixels (A1×(N1−1)<C1<B1−A1×(N1−1)) in the main scanning direction, in the second dot pattern in a third dot array that is any dot array printed by the print elements of one of the first print element row and the second print element row to be aligned in the main scanning direction, second dot groups, each formed of N2 (N2≥2) dots arranged A2 pixels away from each other in the main scanning direction, are arranged at an interval of B2 pixels (B2≥A2×N2), and in a fourth dot array that is a dot array adjacent to the third dot array in the predetermined direction and printed by the print elements of the other one of the first print element row and the second print element row to be aligned in the main scanning direction, the second dot groups are arranged at an interval of B2 pixels while being shifted relative to the third dot array by C2 pixels (A2×(N2−1)<C2<B2−A2×(N2−1)) in the main scanning direction, and C1 and C2 are different from each other.

12. The printing apparatus according to claim 11, wherein B1≥A1×N1×2 and B2≥A2×N2×2.

13. The printing apparatus according to claim 11, wherein N1=N2.

14. The printing apparatus according to claim 11, wherein A1=A2.

15. The printing apparatus according to claim 11, wherein B1=B2.

16. The printing apparatus according to claim 11, wherein C1=−C2.

17. The printing apparatus according to claim 11, wherein the number N1 of dots forming each of the first dot groups and the number N2 of dots forming each of the second dot groups in the case where the predetermined grayscale value is a first grayscale value are greater than the number N1 of dots forming each of the first dot groups and the number N2 of dots forming each of the second dot groups in the case where the predetermined grayscale value is a second grayscale value lower than the first grayscale value.

18. The printing apparatus according to claim 11, comprising:
- a unit configured to divide grayscale data, corresponding to the predetermined grayscale value, into first grayscale data and second grayscale data;
- a quantization unit configured to quantize the first grayscale data by using a first threshold matrix to generate first quantized data and quantize the second grayscale data by using a second threshold matrix different from the first threshold matrix to generate second quantized data; and
- a converting unit configured to convert the first quantized data into first print data printable by the first print element row and the second print element row by using a first index pattern used to set print or non-print of a dot for each of pixels aligned at a resolution twice a resolution of the grayscale data in the predetermined direction and convert the second quantized data into second print data printable by the first print element row and the second print element row by using a second index pattern different from the first index pattern, wherein the first forming unit prints the first dot pattern according to the first print data and the second forming unit prints the second dot pattern according to the second print data.

19. The printing apparatus according to claim 18, wherein the first forming unit and the second forming unit drive the print elements included in the first print element row and the print elements included in the second print element row at different timings according to a predetermined order for print data of the same pixel position in the main scanning direction in each of the forward scan and the backward scan.

* * * * *